US012234086B2

(12) United States Patent
Downing et al.

(10) Patent No.: US 12,234,086 B2
(45) Date of Patent: Feb. 25, 2025

(54) WASTE RECEPTACLE

(71) Applicant: Rubbermaid Commercial Products LLC, Atlanta, GA (US)

(72) Inventors: Brian Wortham Downing, Charlotte, NC (US); Juan Carlos Perez, Huntersville, NC (US); Dylan Arthur Terry, Charlotte, NC (US); Ryan Michael Baker, Charlotte, NC (US); Christopher John Parke, Huntersville, NC (US)

(73) Assignee: Rubbermaid Commercial Products LLC, Atlanta, GA (US)

( * ) Notice: Subject to any disclaimer, the term of this patent is extended or adjusted under 35 U.S.C. 154(b) by 19 days.

(21) Appl. No.: 17/179,024

(22) Filed: Feb. 18, 2021

(65) Prior Publication Data

US 2021/0253343 A1 Aug. 19, 2021

Related U.S. Application Data

(60) Provisional application No. 62/977,876, filed on Feb. 18, 2020.

(51) Int. Cl.
*B65F 1/06* (2006.01)
*B65F 1/16* (2006.01)

(52) U.S. Cl.
CPC ................ *B65F 1/06* (2013.01); *B65F 1/163* (2013.01)

(58) Field of Classification Search
CPC ...... B65F 1/06; B65F 1/04; B65F 1/16; B65F 1/163
USPC ............ 220/495.01, 495.05, 495.06, 495.08, 220/908.1
See application file for complete search history.

(56) References Cited

U.S. PATENT DOCUMENTS

| | | | | | |
|---|---|---|---|---|---|
| 5,542,775 | A * | 8/1996 | Bechtoldt | ............... | F16B 2/245 29/513 |
| D554,320 | S | 10/2007 | Williams | | |
| 8,074,833 | B2 | 12/2011 | Yang et al. | | |
| D730,008 | S | 5/2015 | Yang et al. | | |
| D778,021 | S | 1/2017 | Duvigneau | | |
| 9,771,215 | B2 | 9/2017 | Rogers | | |
| 2019/0152695 | A1* | 5/2019 | Wegner | ..................... | B65F 1/06 |
| 2019/0185263 | A1 | 6/2019 | Yang et al. | | |

FOREIGN PATENT DOCUMENTS

| | | | | |
|---|---|---|---|---|
| EP | 3686129 | * 7/2020 | ................ | B65F 1/06 |

* cited by examiner

*Primary Examiner* — Don M Anderson
*Assistant Examiner* — Elizabeth J Volz
(74) *Attorney, Agent, or Firm* — Eversheds Sutherland (US) LLP

(57) ABSTRACT

A waste receptacle includes a housing defining a rim, the rim defining a rim opening configured to receive a liner. The waste receptacle may include a plurality of retention tabs extending from the rim. At least one retention tab of the plurality of retention tabs extends outward relative to the rim opening. The waste receptacle may include a lid, a lift-rod, a pedal operatively coupled to the lift-rod, and a locking tab configured to lock or unlock the lift-rod. The waste receptacle may include a foldable pedal being foldable about a fold axis between a pedal-extended configuration and a pedal-folded configuration. The waste receptacle may include a plurality of dampening feet.

18 Claims, 25 Drawing Sheets

WASTE RECEPTACLE

CROSS-REFERENCE TO RELATED APPLICATIONS

This application claims the benefit of U.S. Provisional Application No. 62/977,876 filed on Feb. 18, 2020, which is incorporated herein in its entirety by reference.

BACKGROUND

1. Technical Field

The present disclosure relates generally to waste receptacles.

2. Description of the Related Art

Waste receptacles may be used for holding and disposal of a variety of material such as trash, recyclables, yard waste, industrial waste, commercial waste, or medical waste. A significant number of evolutions have occurred with waste receptacles, including indoor household receptacles. Standalone household waste receptacles are predominantly used in household environments, including kitchens, restrooms, or living areas. Household waste receptacles are of varying varieties. Waste receptacles having a step-on pedal are popular, with the step-on pedal actuating a lid of the receptacle.

Waste liners are often used with waste receptacles to promote hygiene and sanitation. Liners may simplify maintenance of waste receptacles. For example, instead of having to replace, empty, wash, or clean the waste receptacle itself, the liner can be removed and discarded with the waste, and replaced with a fresh liner.

SUMMARY

The present disclosure describes waste receptacles.

In embodiments, a waste receptacle includes a housing defining a rim, the rim defining a rim opening configured to receive a liner. The waste receptacle includes a plurality of retention tabs extending from the rim. At least one retention tab of the plurality of retention tabs extends outward relative to the rim opening.

In embodiments, a waste receptacle includes a housing including a base, a rim, and a housing wall extending between the base and the rim. The rim defines a rim opening configured to receive a liner. The waste receptacle includes a lid and a foldable pedal adjacent the base and operatively coupled to the lid. The foldable pedal is movable about a fold axis between a pedal-extended configuration and a pedal-folded configuration.

In embodiments, a waste receptacle includes a housing including a base, a rim, and a housing wall extending between the base and the rim. The rim defines a rim opening configured to receive a liner. The waste receptacle includes a lid, a lift-rod, a pedal disposed adjacent the base and operatively coupled to the lid by the lift-rod, and a locking tab movable between a locked configuration and an unlocked configuration. The locking tab is engaged with the lift-rod in the locked configuration to resist movement of the lift-rod. The locking tab is disengaged from the lift-rod in the unlocked configuration to permit movement of the lift-rod.

In embodiments, a waste receptacle includes a housing including a base, a rim, and a housing wall extending between the base and the rim. The rim defines a rim opening configured to receive a liner. The waste receptacle includes a lid movable between a lid-closed configuration and a lid-open configuration, a lift-rod, and a pedal disposed adjacent the base and operatively coupled to the lid by the lift-rod. The pedal is configured to move the lid between the lid-closed configuration and the lid-open configuration via the lift-rod. The waste receptacle includes a plurality of dampening feet disposed on an exterior of the base and extending in a direction away from the rim opening. The dampening feet are configured to resist shock, force, or torque applied to the housing in response to movement of the pedal, the lift-rod, or the lid.

Figure 1B:
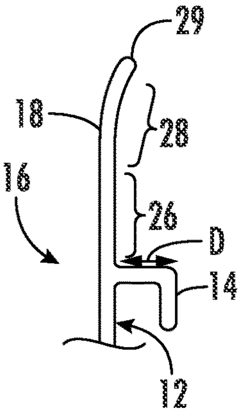
FIG. 1B is a partial cross sectional view of a retention tab and rim of FIG. 1A.

It is to be understood that the invention is not limited in its application to the details of construction and the arrangement of components illustrated in the drawings or set forth in the following description.

DETAILED DESCRIPTION

The present disclosure describes non-limiting embodiments of waste receptacles having various improved features, such as retention tabs for retaining a liner on a rim, locking tabs for locking a lift-rod for opening a lid, foldable pedals, and dampening feet. The embodiments are described in detail herein to enable one of ordinary skill in the art to practice the waste receptacles and associated methods of making, although it is to be understood that other embodiments may be utilized and that logical changes may be made without departing from the scope of the disclosure. Throughout the disclosure, depending on the context, singular and plural terminology may be used interchangeably.

While waste receptacles of varying designs are available, waste receptacles present technical and ergonomic challenges. These problems include, for example, bag or liner retention, preventing movement of receptacle on a floor during pedal use, locking the lid from being used, and ensuring easy removal of a full liner for mess-free disposal. Waste receptacles according to the present disclosure may address one or more of these problems, as described elsewhere in the present disclosure.

While liners are used to promote cleanliness and reduce the need to frequently wash or otherwise clean the receptacle, liner retention and removal continues to present challenges to a typical user. Liners range in sizes, with the most common kitchen liner being 13 gallons, which is the typical nominal volume of a kitchen receptacle. When a liner of such volume is full with waste, or occupied with relatively heavy waste, the weight of the filled liner can be significant, and can cause the liner to collapse into the container. Liner retention means may be used to prevent a filled liner from falling into the receptacle. Additionally, when a liner is removed from the receptacle, the liner may create a suction effeet between the liner and the receptacle. This effeet can provide difficulty when trying to remove the filled liner. Even when empty, a liner may disengage from a receptacle, and may benefit from an attachment or retention means. Further, the attachment or retention means may provide the liner with a sufficient opening envelope to accept waste.

In conventional waste receptacles, the rim of the receptacle may be utilized to retain the liner. However, users may find it difficult to stretch the bag around the perimeter of the can. Features that allow an easy removal of a full liner are not common. Some designs may incorporate retention arms and/or a hard-plastic liner. While retention arms may make it easier to install a new liner, they may make it more cumbersome to remove a full liner; as the arms need to be raised for removal of the liner. A separate hard-plastic liner is also difficult to remove from the receptacle for both installation and removal of the liner.

Another problem associated with receptacles arises from movement of receptacles in response to shock, force, or torque. The most common flooring in a standard kitchen is a hard surface floor, such as ceramic, tile, vinyl, or wood. These types of hard surfaces present challenges for receptacles with step-on pedals. For example, during actuation of the pedal to open the lid of the receptacle, the pedal mechanism engages a lift mechanism at the back of the receptacle that is attached to the lid, thereby allowing the lid to open. When the user releases the pedal, the lid closes. This action of step-on pedal receptacles generates torque at the base of the can. The receptacle may experience movement, front to back, during this process. This movement can be exhibited as a rocking effeet, or typically as a sliding effeet across the floor. This is generally undesirable to the end user.

It may be desirable to restrict access to a liner in a receptacle, while the liner is in use and not ready for removal or disposal. For example, pets and/or small children may attempt to tamper with the waste in the receptacle, or with the liner. Such tampering can result in the removal of waste, or even cause the receptacle to be knocked over in the process, thereby spilling waste onto the kitchen floor. Conventional step-on receptacles have no means to prevent this from occurring. Another problem with a step-on receptacle is the difficulty of keeping the lid open if desired. In normal operation, the lid only opens when the user's foot is actively depressing the pedal. However, users may have a need to use the receptacle in a prolonged open position. Step-on receptacles may either require the user to keep their foot on the pedal or remove the lid from the receptacle, which can be cumbersome.

While some designs may incorporate a locking feature, conventional locks are only designed to lock the lid closed, and cannot maintain the lid open. Further, the lock designs only function as a lock when attempting to actuate the step-on pedal of the receptacle. For example, if a user attempts to open the lid of the receptacle by hand, with the lock engaged, the lid may still open. Conventional locking features are also prone to break and/or only operate when extreme force is used to engage/disengage the feature. Moreover, such locking features may be in a conspicuous area on the front of the receptacle.

Because of the volume occupied by waste receptacles, shipping and storage of waste receptacles also presents problems. In large-scale production where product is typically sold through varying styles of distribution channels, it is cost-effeetive for manufacturers or wholesalers to ship large quantities of product together. However, due to the inherent design of step-on receptacles this can be a two-fold challenge. If the pedal protrudes from the front of the receptacle, it makes it easier for the end user to actuate, but eliminates the receptacle's ability to be stacked or nested for distribution purposes. Many step-on receptacles in the market experience this problem and are thereby shipped in individual boxes. Some manufacturers have designed their step-on receptacles with a recessed pocket for the pedal to sit. Since the pedal is recessed, it does allow the manufacturer to nest the receptacles for shipping but also decreases the case of pedal actuation for the end-user. Many manufacturers utilize this style of design for step-on receptacles. Providing for nesting often requires design compromises to allow nesting. For example, providing step-on pedals highly recessed into the base of the receptacle may promote nesting but hinder actuating the pedal during usage. For example, some such pedals cannot be operated unless directly facing the receptacle.

In embodiments, a waste receptacle includes a housing defining a rim, the rim defining a rim opening configured to receive a liner. The waste receptacle includes a plurality of retention tabs extending from the rim. At least one retention tab of the plurality of retention tabs extends outward relative to the rim opening.

The outward extension of the retention tabs promotes retention of the liner, for example, with the liner remaining snug after installation and during use. The height or vertical reach of the retention tabs allows for flexibility during liner installation and removal. An inter-tab spacing, for example, space between tabs along the rim, allows for hand or tool access during liner installation. The spacing may also provide added venting during liner removal, which may mitigate pull from a vacuum or low pressure zone in an interior of the receptacle. The retention tabs also allow the liner to be secured to the receptacle while being concealed from view. For example, the lid or shroud may be placed over the liner and retention tabs such that the liner is not visible when the lid is closed.

In embodiments, a waste receptacle includes a housing including a base, a rim, and a housing wall extending between the base and the rim. The rim defines a rim opening configured to receive a liner. The waste receptacle includes a lid and a foldable pedal adjacent the base and operatively coupled to the lid. The foldable pedal is movable about a fold axis between a pedal-extended configuration and a pedal-folded configuration.

Such a lifting mechanism including a foldable pedal allows nesting of multiple receptacles, for example, for storage or shipping. The lid or shroud may be separated to accomplish nesting of the bodies, but without requiring removal of the pedal. The pedal can be folded into the base of the receptacle to allow this nesting to occur. After de-nesting and when ready for use, the pedal can be folded out to extend for accepting a step, to provide ample space for user operation from a face of the receptacle. The folding pedal may also allow a user to fold up the pedal to prevent unintended use of the receptacle by pets and/or small children, or other parties. For example, the pedal may not actuate the lid in the folded configuration. The lifting mechanism may also reduce the force generated at the base of the receptacle during operation, allowing the receptacle to remain stable and reduce rocking. For example, the design of the lifting mechanism may require less force to actuate the pedal and open the lid. In embodiments, the pedal pivot points or axis as well as the attachment point of the lift rod to pedal may both be closer to the center of the receptacle, which may provide more stability during use.

In embodiments, a waste receptacle includes a housing including a base, a rim, and a housing wall extending between the base and the rim. The rim defines a rim opening configured to receive a liner. The waste receptacle includes a lid, a lift-rod, a pedal disposed adjacent the base and operatively coupled to the lid by the lift-rod, and a locking tab movable between a locked configuration and an unlocked configuration. The locking tab is engaged with the lift-rod in the locked configuration to resist movement of the lift-rod. The locking tab is disengaged from the lift-rod in the unlocked configuration to permit movement of the lift-rod.

The locking tab may be a sliding component fixed to the receptacle housing along a rear portion of the rim. This locking tab may either lock the lid either open or closed, whether the lid is actuated by the pedal or by hand. Thus, the lid may be locked in the open or closed position using a single component—the locking tab. The locking tab may be disposed at the rear of the receptacle, so it is concealed from view, and where unauthorized parties may not access the tab. The locking tab may also allow holding the lid in the open position without continued user intervention, providing direct access to the rim opening to dispose waste for extended periods.

In embodiments, a waste receptacle includes a housing including a base, a rim, and a housing wall extending between the base and the rim. The rim defines a rim opening configured to receive a liner. The waste receptacle includes a lid movable between a lid-closed configuration to a lid-open configuration, a lift-rod, and a pedal disposed adjacent the base and operatively coupled to the lid by the lift-rod. The pedal is configured to move the lid between the lid-closed configuration and the lid-open configuration via the lift-rod. The waste receptacle includes a plurality of dampening feet disposed on an exterior of the base and extending in a direction away from the rim opening. The dampening feet are configured to resist shock, force, or torque applied to the housing in response to movement of the pedal, the lift-rod, or the lid.

The base may be integrated in the housing, or may be a distinct element securable to the housing. The dampening feet may be attached via a snap mechanism. The dampening feet may include a dampening member, for example, a rubber or elastomeric member, to absorb force, shock, or torque generated during use. In embodiments, the dampening feet may not include a separate dampening member, and may itself include a relatively soft or flexible dampening material. In embodiments, the base itself may be formed of or include a relatively soft or flexible dampening material or material layer, which may allow the entire base to function as a dampening foot. The dampening feet may reduce or eliminate sliding or "walking" of the receptacle during use. Additionally, the dampening feet may reduce rocking and noise generation during use. In embodiments, providing multiple dampening feet may provide additional dampening. For example, providing dampening feet adjacent each corner may further promote stability of the receptacle in use.

Figure 1A:
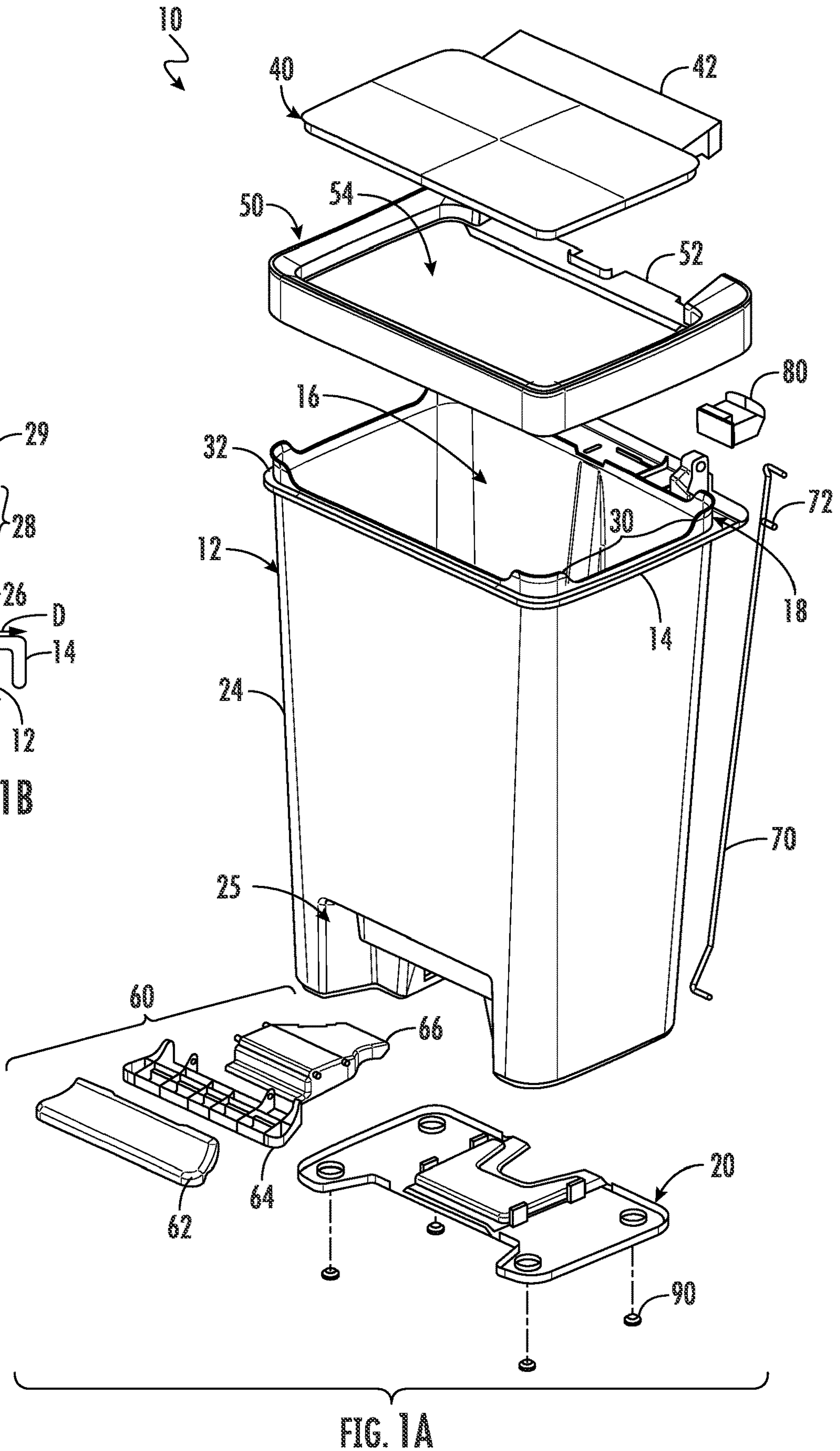
FIG. 1A is a conceptual exploded perspective view of a waste receptacle including a housing defining a rim and a rim opening, a plurality of retention tabs, a lid, a shroud, and a pedal.

FIG. 1A is a conceptual exploded perspective view of a waste receptacle 10 including a housing 12 defining a rim 14 and a rim opening 16, a plurality of retention tabs 18, a lid 40, a shroud 50, and a pedal 60. FIGS. 1B to 1J illustrate additional views of waste receptacle 10.

In embodiments, waste receptacle 10 includes housing 12 defining rim 14. Housing 12 may be formed of any material suitable for holding or supporting waste. Housing 12 may be formed of one or more materials, or a composite material. In some embodiments, one or more materials forming housing 12 may include one or more of a metal, an alloy, a polymer, a glass, a ceramic, a fabric, a composite, or combinations thereof. The material may be rigid, semi-rigid, or flexible. In some embodiments, housing 12 is substantially rigid, for example, tending to maintain its shape and resist deformation.

Housing 12 may have any general shape, for example, cuboidal, rectangular cuboidal, cylindrical, curved, polygonal, or any other suitable shape. Housing 12 may include faces or walls that may be smoothly interconnected, or may intersect at vertices or edges. For example, housing 12 may include a housing wall 24. In some embodiments, housing 12 may have substantially the same cross-sectional area along a height of the housing. In other embodiments, the cross-sectional area may vary, for example, continuously increase along a height, or decrease, or any other variation. Housing 12 may define at least one opening, for example, an upper opening, to receive a liner. In some embodiments, housing 12 may be open at one end and closed at another end.

In some embodiments, housing 12 may be open at both ends, for example, being in the form of a circular ring, an ellipsoidal ring, a toroid, a square-shaped ring, a polygonal ring, or any complex structure that does not have a bottom, but is capable of holding a liner. In some such embodiments, housing 12 may be held by a stand. For example, housing 12 may only include rim 14 or a similar structure, without including a wall. For example, while housing wall 24 is shown in FIG. 1A, housing 12 may not include a housing wall 24 separate from rim 14.

Rim 14 is generally defined at a top or upper end of housing 12, for example, relative to the direction of gravity. Rim 14 defines rim opening 16 configured to receive the liner (not shown in FIG. 1A). The liner may be formed of one or more materials including a polymer, or any other suitable liner material. In some embodiments, the liner includes a reinforced material. The liner may be placed into housing 12 through an opening, and may be pushed, pulled, stretched, or otherwise disposed in housing 12, for example, being generally secured about or along rim 14.

Rim 14 may be integrated with and continuous with a body of housing 12, or may be formed as a separate component permanently or temporarily secured to housing 12. Rim 14 may define a lateral surface extending outward relative to rim opening 16, and may further define a lip transverse to the lateral surface. The lip may extend upward or downward. As an example, the lip extends downwards, as shown in FIG. 1B.

FIG. 1B is a partial cross sectional view of a retention tab 18 and rim 14 of FIG. 1A. Waste receptacle 10 includes a plurality of retention tabs extending from rim 12, where at least one retention tab 18 of the plurality of retention tabs extends outward relative to rim opening 16. In some embodiments, each retention tab of the plurality of retention tabs is identical in shape and size to retention tab 18. In other embodiments, different retention tabs may have a generally similar shape while having different sizes, or have differ in one or more of shape, size, or orientation. In some embodiments, one or more retention tab of the plurality of retention tab may exhibit a difference in shape or size, but yet generally extend outward relative to rim opening 16.

In some embodiments, the entirety of retention tab 18 is flat and continuously extend in an outward direction relative to rim opening 16. In other embodiments, one or more portions of retention tab 18 may be flat, polygonal, curved, angled, or otherwise contoured. In some embodiments, the entirety of retention tab 18 may be curved or contoured. The curve may be a simple curve with a single radius of curvature, or may be a complex curve or contour with multiple radii of curvature. In some embodiments, one or more portions of retention tab 18 may not extend outward, for example, extending strictly upward, or even inward, however, having at least one portion extending outward.

In some embodiments, retention tab 18 defines a base portion 26 adjacent rim 14 and an upper edge 29 extending from base portion 26 and away from rim opening 16. Upper edge 29 projects outward, or is oriented outward, relative to rim opening 16. For example, another portion of retention tab 18 between base portion 26 and upper edge 29 may be oriented inward vertical, or outward, with upper edge 29 yet oriented outward. In some embodiments, retention tab 18 includes a curved portion 28 between base portion 26 and upper edge 29. For example, upper edge 29 flares outward relative to rim opening 16. In some embodiments, instead of curved portion 28, retention tab may include a portion having any suitable shape between base portion 26 and upper edge 29. Base portion 26 itself may be oriented outward, inward, or vertical, and may be flat, textured, contoured, or curved.

A portion of or an entirety of retention tab 18 may be ribbed, channeled, dotted, wavy, zig-zag, or otherwise textured, to promote liner retention. Retention tab 18 may define a continuous uninterrupted and unbroken surface, or may define one or more voids or openings along retention tab 18.

Retention tab 18 may be formed of any material described with reference to housing 12. In some embodiments, retention tab 18 and housing 12 are formed of the same material. In some such embodiments, retention tab 18, rim 14, and housing 12 are formed of the same material. In some such embodiments, retention tab 18, rim 14, and housing 12 constitute a unitary structure. For example, retention tab 18, rim 14, and housing 12 may be machined, molded, stamped, or additively manufactured as an integrated structure. In other embodiments, retention tab 18 may be formed of a different material from one or both of rim 14 or and housing 12, and may be fabricated using the same or similar technique as or using a different technique from one or both of rim 14 or housing 12. In some embodiments, retention tab 18 is formed as a separate component and secured to housing 12, or rim 14. For example, retention tab 18 may be welded, adhered, snapped, friction-fit, over-molded, stamped, or otherwise secured to housing 12 or a portion of housing 12.

In some embodiments, retention tab 18 is inset relative to rim 14. For example, base portion 26 of retention tab 18 may be inset from an outer edge of rim 14 relative to rim opening 16. The inset distance "D" shown in FIG. 1B may be any suitable distance. The inset may promote concealment of the liner secured to retention tab 18, for example, by allowing lid 40 or shroud 50 to contact an outer portion of rim 14 while covering or otherwise concealing the secured liner and retention tab 18.

In embodiments, the plurality of retention tabs defines at least one inter-tab spacing 30 configured to receive a finger or a tool between adjacent retention tabs of the plurality of retention tabs to contact and remove the liner from the retention tabs. Inter-tab spacing 30 may be defined by the length of inter-tab separation along rim 14, and by the height of respective tabs. One or both of the length and the height may be dimensioned based on ergonomic considerations, for example, to allow a portion of a hand or one or more fingers to lift off a portion of the liner stretched or secured between adjacent retention tabs.

In some embodiments, rim 14 defines at least one corner 32. For example, corner 32 may be aligned with or adjacent a corner defined by housing 12. In some embodiments, the retention tab 18 is disposed at a respective corner of the at least one corner 32 of rim 14. For example, retention tab 18 may be adjacent to or aligned with corner 32. In some such embodiments, retention tab 18 extends along rim 14 about two sides of corner 32, and is laterally curved about corner 32. Such lateral curvature may be a part of curvature between upper edge 29 and base portion 26 of retention tab 18, or of any suitable portion of retention tab 18. In some embodiments, retention tab 18 exhibits a complex, concavo-convex, composite, or saddle curvature or polygonal shape, or combinations thereof, so that retention tab 18 both extends outward relative to rim 16 and curves about corner 32. In some embodiments, the at least one corner consists of four corners, and the at least one retention tab (or plurality of retention tabs) consists of four retention tabs, each retention tab 18 of the four retention tabs being disposed at a respective corner 32 of the four corners.

The outward extension of upper edge 29, and generally, an outward extension of a portion of retention tab 18, may promote retention of the liner secured to tab 18. For example, the outward extension may cause at least a portion of the liner to be stretched or pulled taut along retention tab 18, or along the plurality of the retention tabs. Further, the outward extension may also prevent inadvertent detachment of the liner from the retention tab, as compared to a strictly upward tab, or an inward tab. Additionally, the outward extension may also promote sustaining weight of waste collected in the liner, including when the liner is partially or completely filled, while avoiding tearing, breaking, or detachment of the liner during removal or replacement.

While waste receptacle 10 is shown in FIG. 1A with lid 40, shroud 50, and pedal 60, in some embodiments, waste receptacle 10 may not include one or more of lid 40, shroud 50, or pedal 60. For example, in some such embodiments, waste receptacle 10 excludes pedal 60 and is not pedal-operated. In some pedal-free embodiments, waste receptacle 10 includes shroud 50, but excludes lid 40. Thus, waste receptacle 10 may be lid-free and pedal-free. In some embodiments, waste receptacle 10 may include one or both of lid 40 and pedal 60, but exclude shroud 50. Thus, waste receptacle 10 may be shroud-free. In some embodiments, lid 40 may be shaped, structured, configured, or otherwise be similar to shroud 50 itself, such that lid 40 functions as both shroud and lid. For example, lid 40 may define a lip that extends downward and surrounds rim 14 and covers retention tab 18.

Lid 40 may define a lid edge 42. Shroud 52 may define a shroud edge 52, and a shroud opening 54. In embodiments in which waste receptacle 10 includes shroud 50, shroud opening 54 may be generally aligned with, parallel to, or coplanar with rim opening 16, so that waste is received through shroud opening 54 and rim opening 16. In embodiments in which waste receptacle includes both lid 40 and shroud 50, lid edge 42 and shroud edge 52 may be aligned or parallel, and lid 40 and shroud 50 may be respectively inclinable or movable about lid edge 42 and shroud edge 52. Further, in some such embodiments, lid 40 may be shaped similarly to shroud opening 54, but slight larger or having a portion extending at least slightly beyond shroud opening 54, so that lid 40 may rest against shroud 50 without falling through shroud opening 54. In some embodiments, lid 40 may be inclinable relative to shroud opening 54 about lid edge 42. In other embodiments, lid 40 is completely separable from shroud opening 54.

In embodiments in which waste receptacle 10 includes lid 40, lid 40 may be movable between a lid-closed configuration in which lid 40 extends laterally across rim opening 16 and a lid-open configuration in which lid 40 is spaced from rim opening 16.

Figure 2:
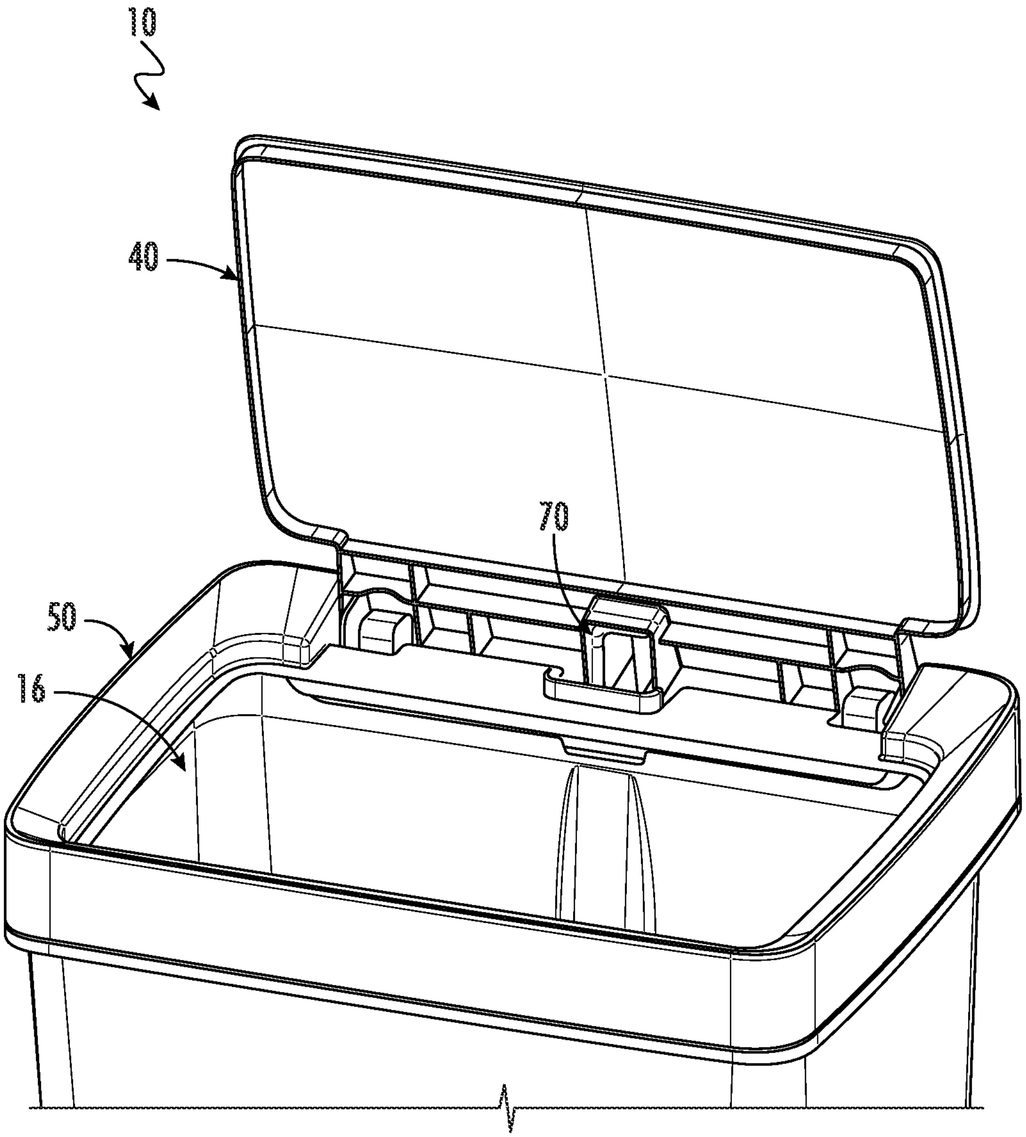
FIG. 2 is a partial perspective view of the waste receptacle of FIG. 1A in a lid-open configuration.

FIG. 2 is a partial perspective view of waste receptacle 10 of FIG. 1A in a lid-open configuration. As seen in FIG. 2, lid 40 is inclined and spaced from rim opening 16, allowing rim opening 16 to accept waste. Further, as seen in FIG. 2, shroud 50 contacts rim 14, and conceals retention tab 18 from view. In some embodiments, lift-rod 70 pushes open lid 40, for example, in response to a force exerted on pedal 60, which may be operatively coupled to lift-rod 70. While in the embodiment shown in FIG. 1A, lift-rod 70 pushes open lid 40, in other embodiments, waste receptacle 10 may exclude lift-rod 70, and lid 10 may be opened by hand or by a tool. Lift-rod 70 may be formed of any suitable rigid material, for example, any material pr combination of materials described with reference to housing 12. In some examples, lift-rod 70 includes metal or alloy.

In some embodiments, lid 40 is secured along a lid edge 42 to rim 14 (or otherwise to housing 12) and is configured to pivot about lid edge 42 relative to rim opening 16 between the lid-open configuration and the lid-closed configuration. For example, lid 40 may be secured by one or more of a pin, a clip, a biasing element, a spring, an axle, or the like to housing 12 or rim 14. In other embodiments, lid 40 is not secured to housing 12 or rim 14, and may be liftable or separable from housing 12 without disassembly of waste receptacle 10. In embodiments in which waste receptacle 10 includes both lid 40 and shroud 50, lid 40 may be secured to shroud 50, for example, about lid edge 42 and shroud edge 52, in a manner similar to that described with reference to securing lid 40 to rim 14.

While lid 40 may incline to open, for example, relative to rim 14, in other embodiments, lid 40 may be completely separable from housing 12. For example, lid 40 may not be secured to housing 12, and may simply be lifted off housing 12. Thus, lid 40 may be completely separable from rim 14 in the lid-open configuration. The complete separation may not require decoupling, separation, or disassembly of any component of waste receptacle 10, and may be accomplished simply by spacing apart lid 40 from housing 12.

Whether or not lid 40 is secured to housing 12, lid 40 may extend laterally across shroud opening 54 (or rim opening 16) in the lid-closed configuration, and lid 40 may be spaced from shroud opening 54 (or rim opening 16) in the lid-open configuration.

Figure 3A:
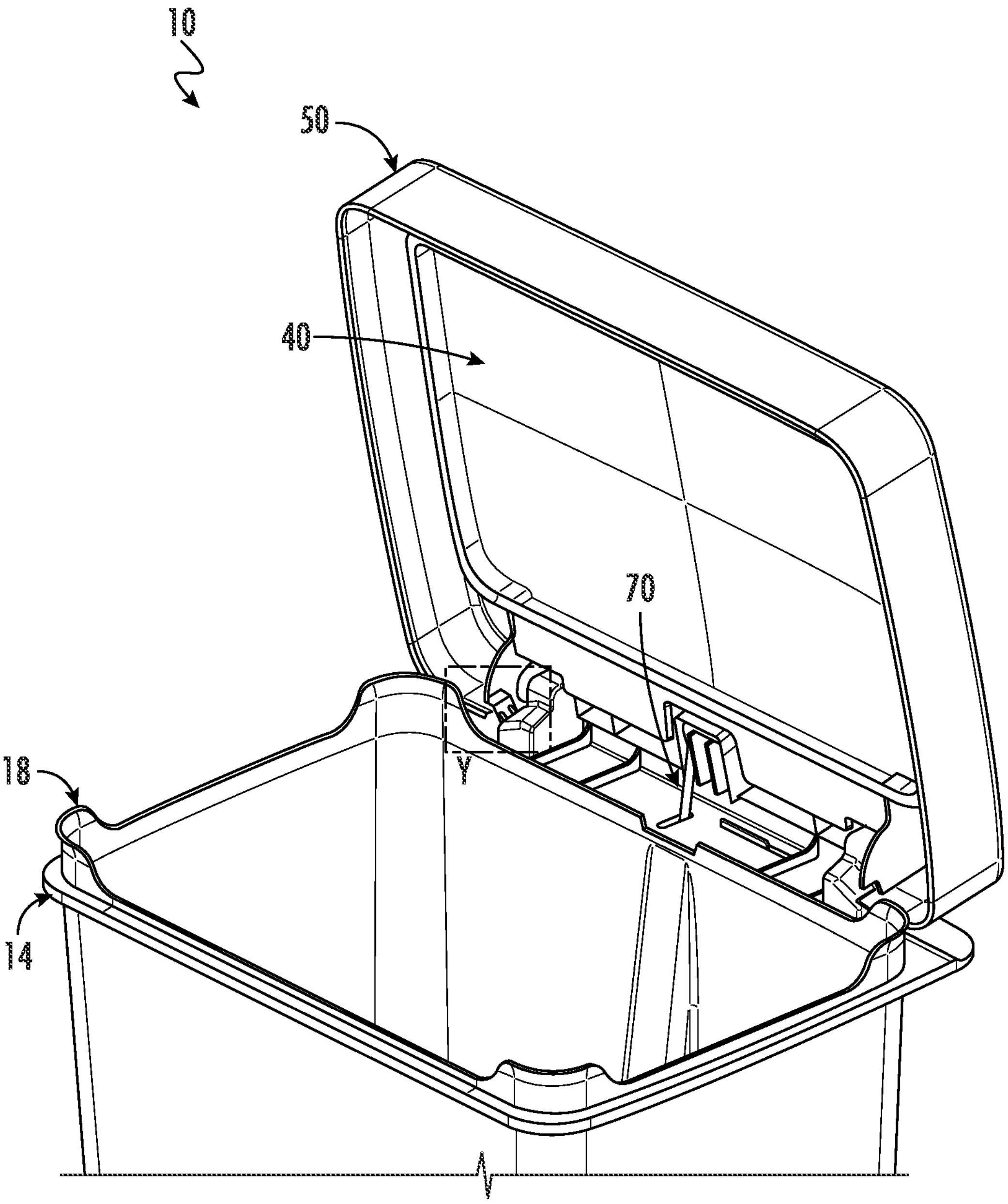
FIG. 3A is a partial perspective view of the waste receptacle of FIG. 1A in a shroud-open configuration showing one or more retention tabs.

FIG. 3A is a partial perspective view of waste receptacle 10 of FIG. 1A in a shroud-open configuration showing one or more retention tab 18. In such a configuration, the liner may be secured to or removed from the retention tabs, which are exposed in the shroud-open configuration. As seen in FIG. 3A, shroud 50 is inclined and spaced from rim 14, allowing rim 14 to accept a liner on retention tab 18 and other retention tabs (or be removed). Shroud 50 may be lifted manually, for example, by a tool or hand.

In some embodiments, shroud 50 is secured along a shroud edge 52 to rim 14 (or otherwise to housing 12) and is configured to pivot about shroud edge 52 relative to rim opening 16 between the shroud-open configuration and the shroud-closed configuration. For example, shroud 50 may be secured by one or more of a pin, a clip, a biasing element, a spring, an axle, or the like to housing 12 or rim 14. In other embodiments, shroud 50 is not secured to housing 12 or rim 14, and may be liftable or separable from housing 12 without disassembly of waste receptacle 10.

Figure 1C:
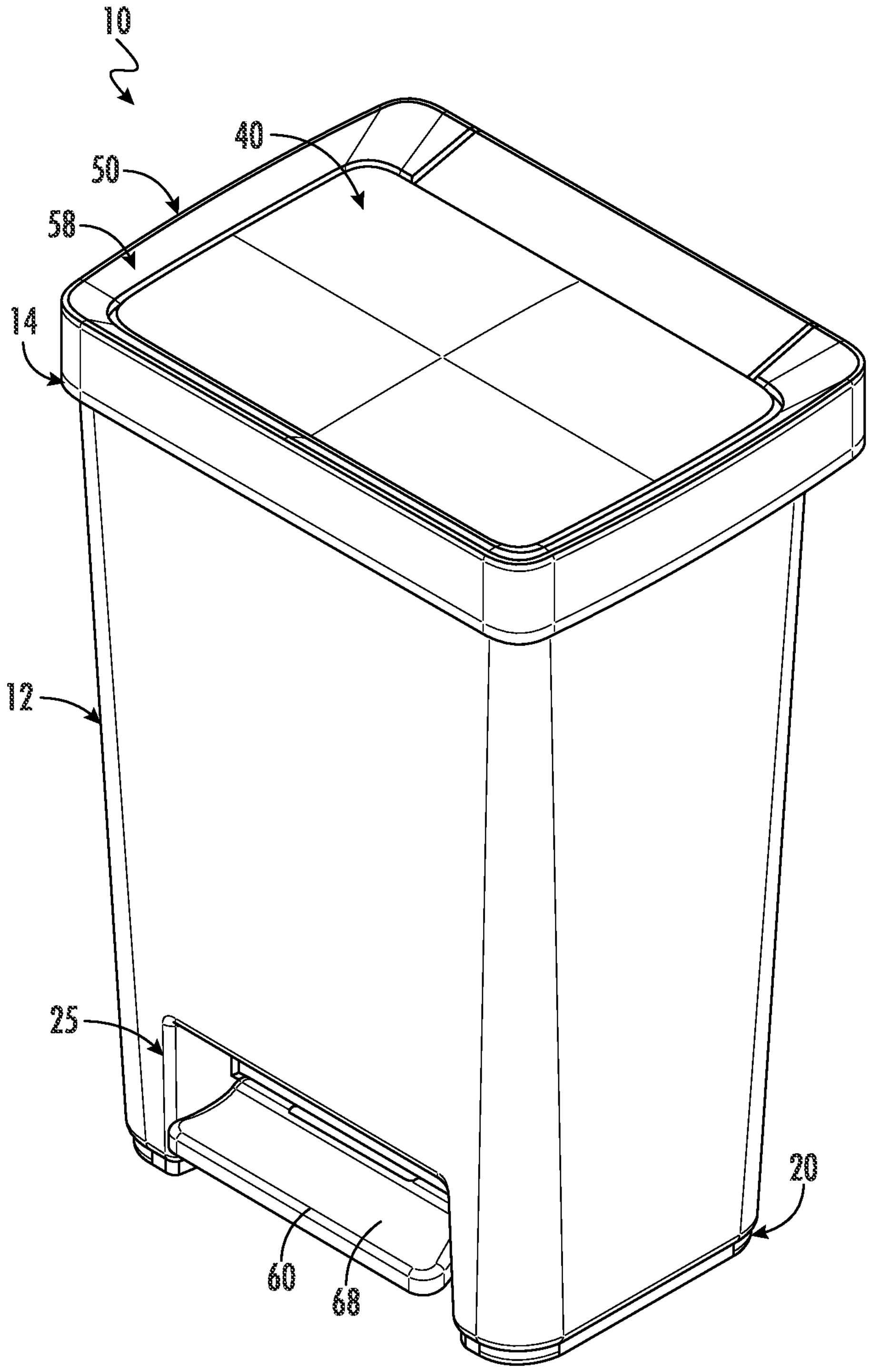
FIG. 1C is a front perspective view of the waste receptacle of FIG. 1A.
Figure 1D:
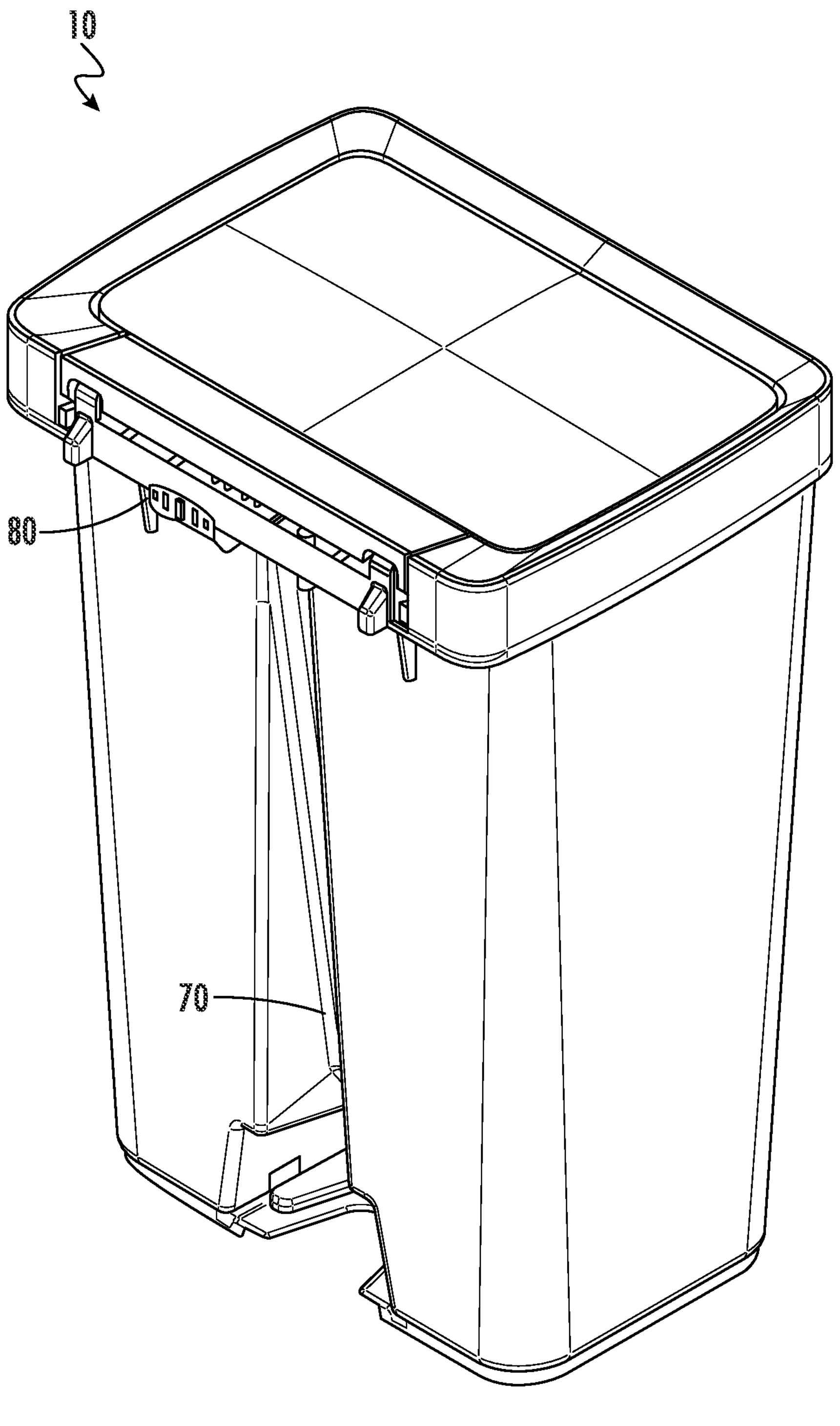
FIG. 1D is a rear perspective view of the waste receptacle of FIG. 1A.
Figure 1E:
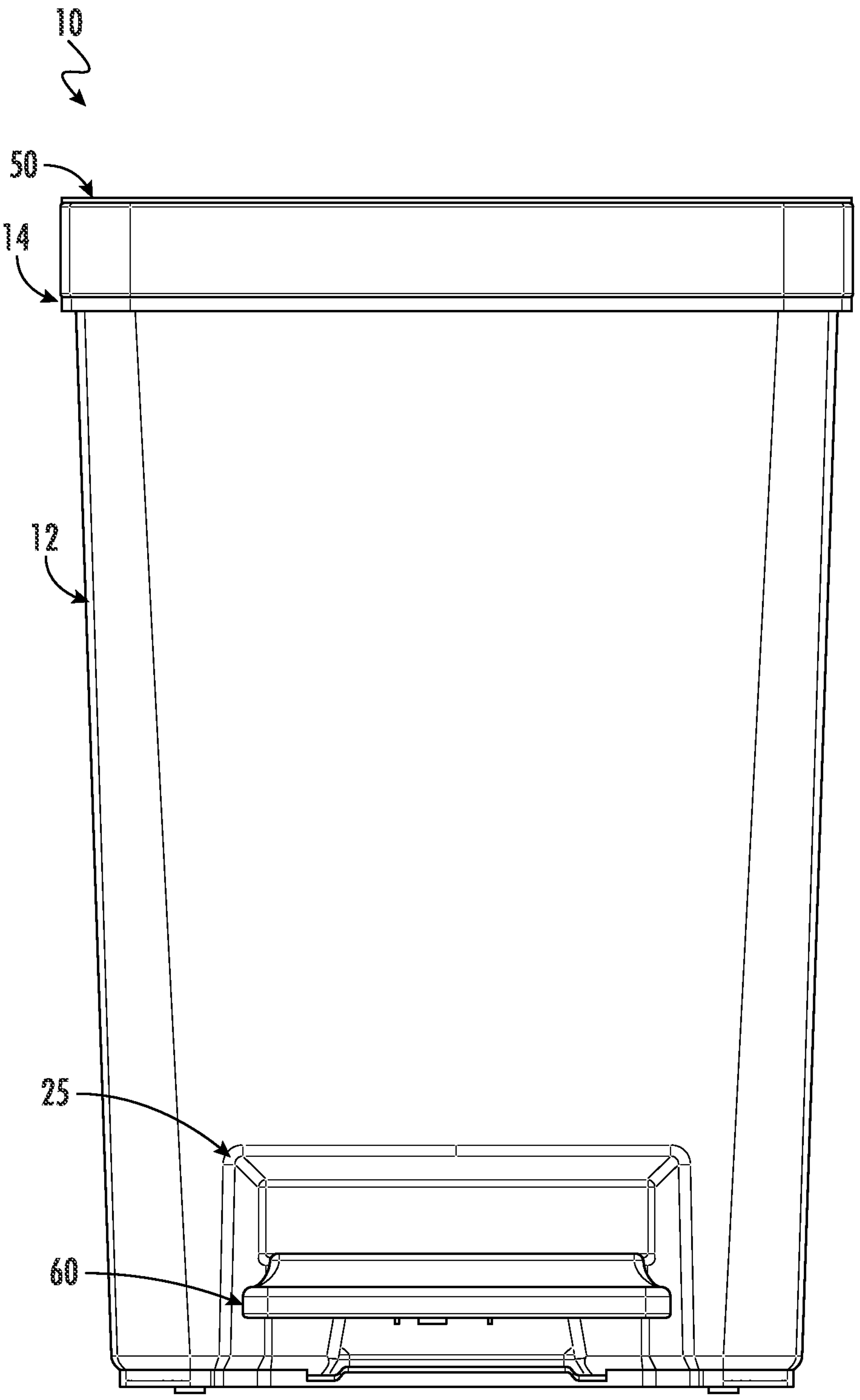
FIG. 1E is a front view of the waste receptacle of FIG. 1A.
Figure 1F:
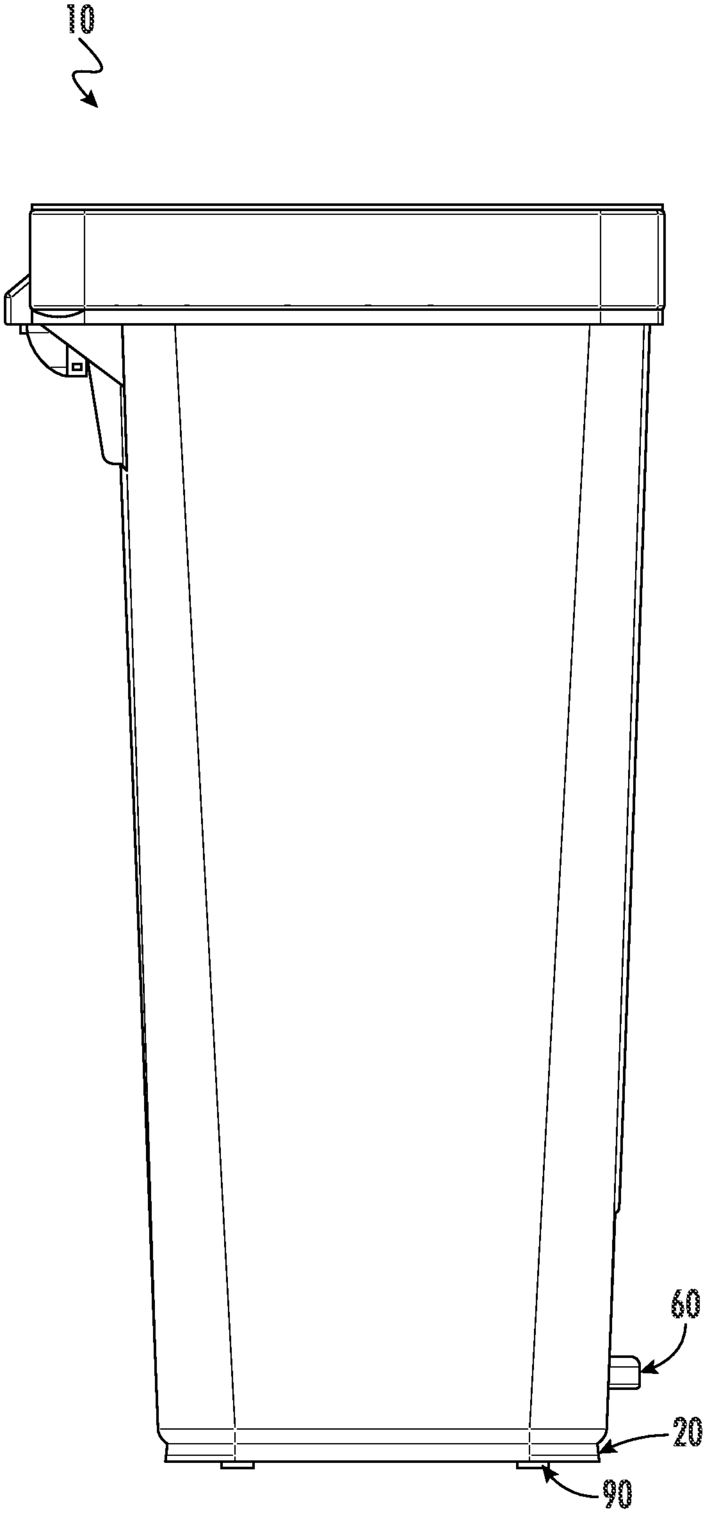
FIG. 1F is a left side view of the waste receptacle of FIG. 1A.
Figure 1G:
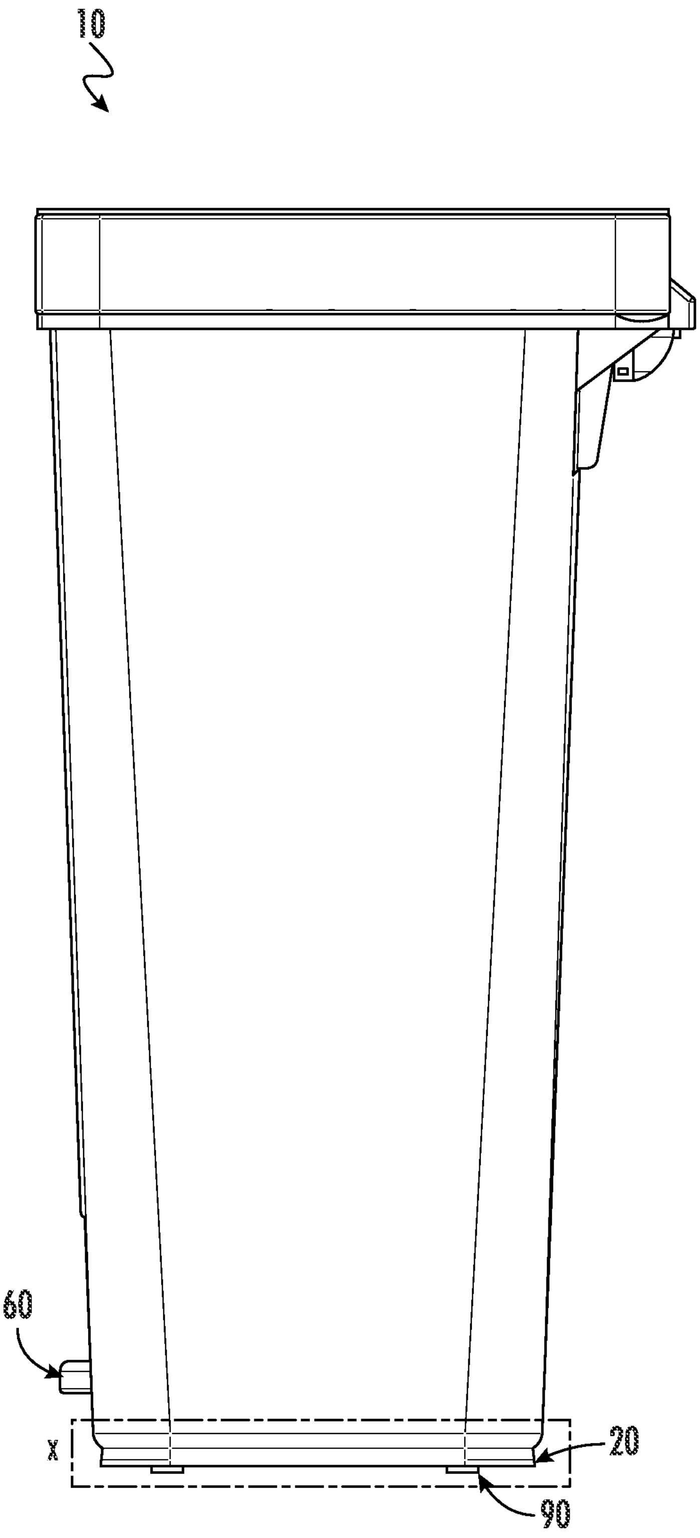
FIG. 1G is a right side view of the waste receptacle of FIG. 1A.

Shroud 50 may define an inward sloping or inclining shroud surface 58 as seen in FIG. 1C. For example, shroud surface 58 may slope downward in a direction toward shroud opening 54 or toward rim opening 16. Thus, in some embodiments, one or more of rim opening 16, lid 40, or shroud opening 54 may be surrounded by raised or inclined shroud surface 58. Providing such an inclined shroud surface may promote retention of waste directed towards waste receptacle 10.

Figure 3B:
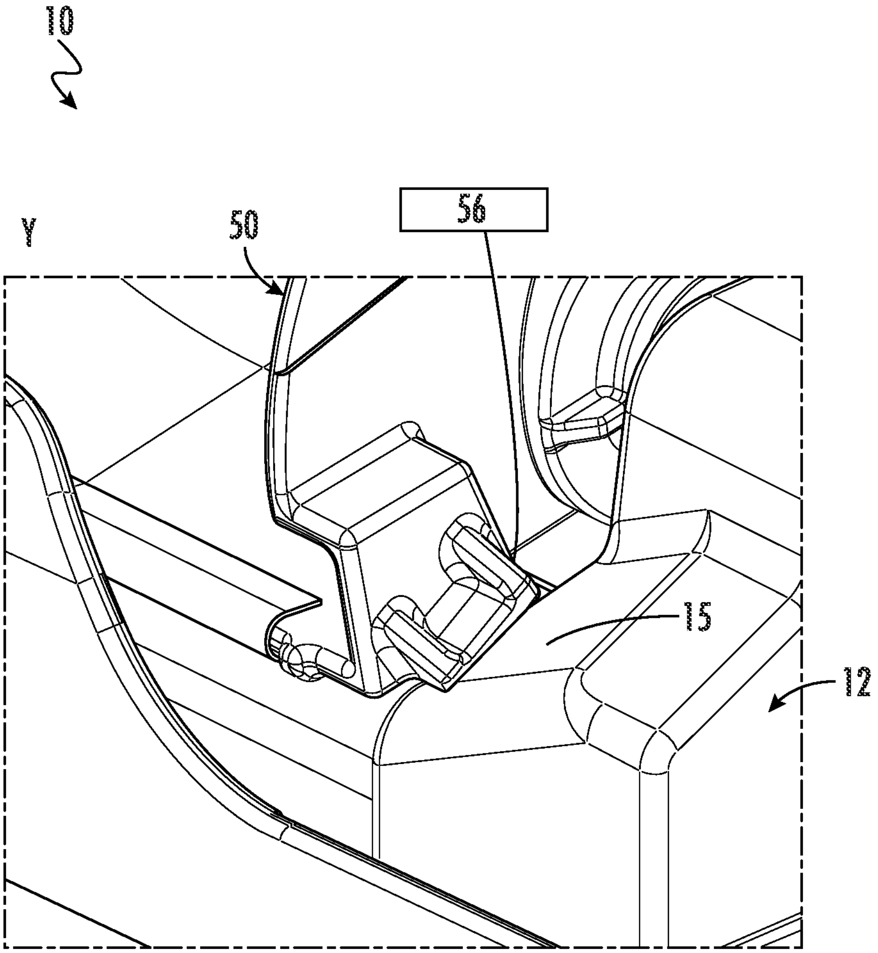
FIG. 3B is a partial enlarged view of region Y of FIG. 3A.

Waste receptacle 10 may include features to facilitate opening and holding of shroud 50 in the shroud-open configuration. For example, shroud 50 may define a shroud lock 56, as seen in FIG. 3B. Shroud lock 56 may include a tab or a protrusion that engages a portion of housing 12. For example, housing 12 may define a ledge 15, and shroud lock 56 may engage with ledge 15 to promote retention of shroud 50 in the shroud-open configuration.

While shroud 50 may incline to open, for example, relative to rim 14, in other embodiments, shroud 50 may be completely separable from housing 12. For example, shroud

50 may not be secured to housing 12, and may simply be lifted off housing 12. Thus, shroud 50 may be completely separable from rim 14 in the shroud-open configuration. The complete separation may not require decoupling, separation, or disassembly of any component of waste receptacle 10, and may be accomplished simply by spacing apart shroud 50 from housing 12. In some such embodiments where waste receptacle 10 includes both lid 40 and shroud 50, lid 40 and shroud 50 may be independently separable from rim 14 or from each other, and may also be separable as a combination from rim 14.

In some embodiments, lid 40 is secured along lid edge 42 to shroud 50 and configured to pivot about lid edge 42 relative to shroud opening 54 between the lid-open configuration and the lid-closed configuration.

FIG. 3B is a partial enlarged view of region Y of FIG. 3A.

Figure 4A:
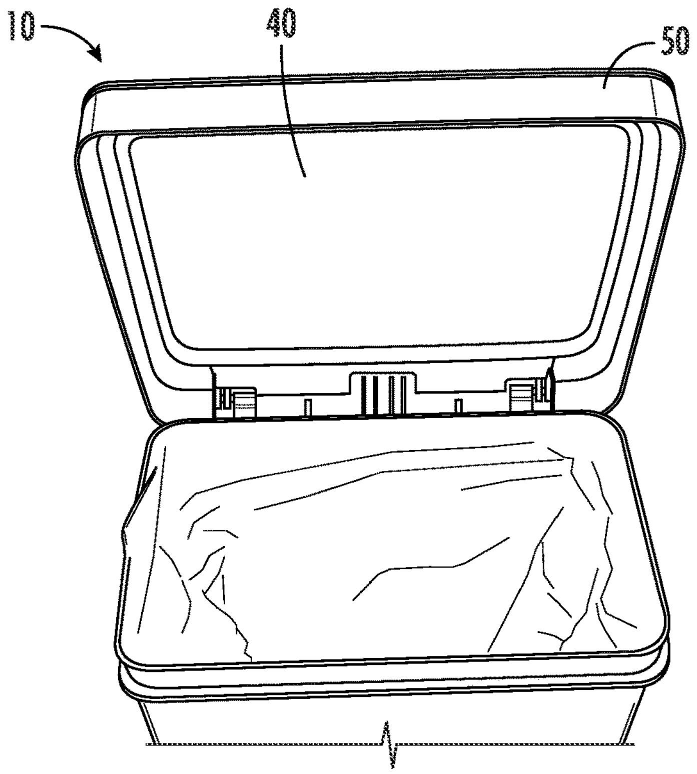
FIG. 4A is a front perspective view of the waste receptacle of FIG. 1A in a shroud-open configuration with a liner secured to one or more retention tabs.
Figure 4B:
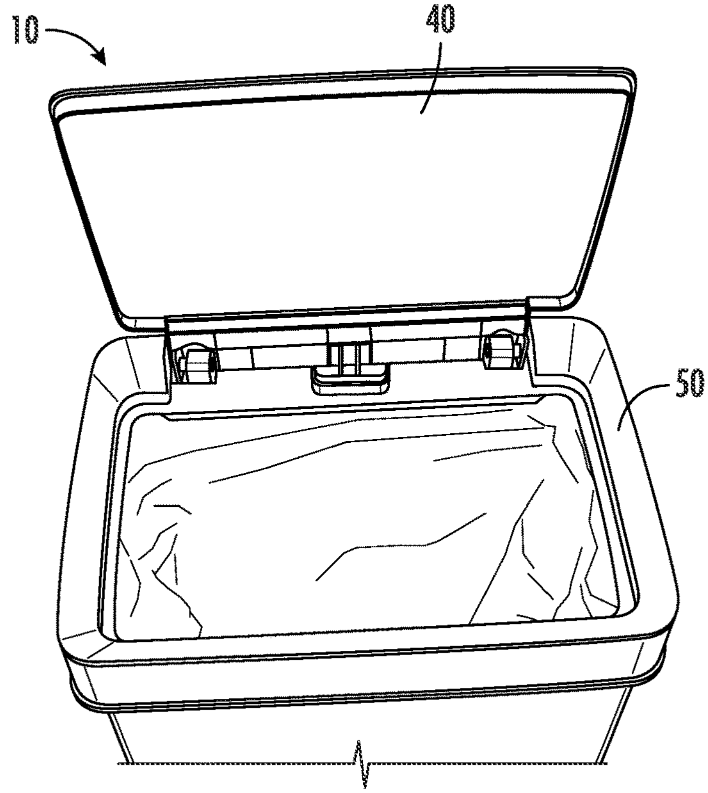
FIG. 4B is a front perspective view of the waste receptacle of FIG. 4A in a lid-open configuration with a liner secured to one or more retention tabs.

FIG. 4A is a front perspective view of waste receptacle 10 of FIG. 1A in a shroud-open configuration with the liner secured to one or more retention tabs 18. As seen in FIG. 4A, the retention tabs hold an upper portion of the liner taut and secure, ready to accept waste, and reducing inadvertent detachment. FIG. 4B is a front perspective view of waste receptacle 10 of FIG. 4A in a lid-open configuration with the liner secured to one or more retention tabs 18. As seen in FIG. 4B, the portion of the liner secured to retention tab 18 and retention tab 18 itself is concealed from view. Thus, shroud 50 may cover and conceals the plurality of retention tabs in the shroud-closed configuration. Further, shroud 50 may also promote securing of the liner to the retention tab 18.

In some embodiments, the plurality of retention tabs is configured to securely retain the liner in any of the shroud-open configuration, the shroud-closed configuration, the lid-open configuration, and the lid-closed configuration.

Some embodiments in which waste receptacle 10 includes pedal 60 are described with reference to FIGS. 1A to 10B. In some such embodiments, waste receptacle 10 also includes a locking tab 80 in addition to pedal 60. In some such embodiments, waste receptacle 10 also includes dampening feet 90 in addition to pedal 60.

Figure 5A:
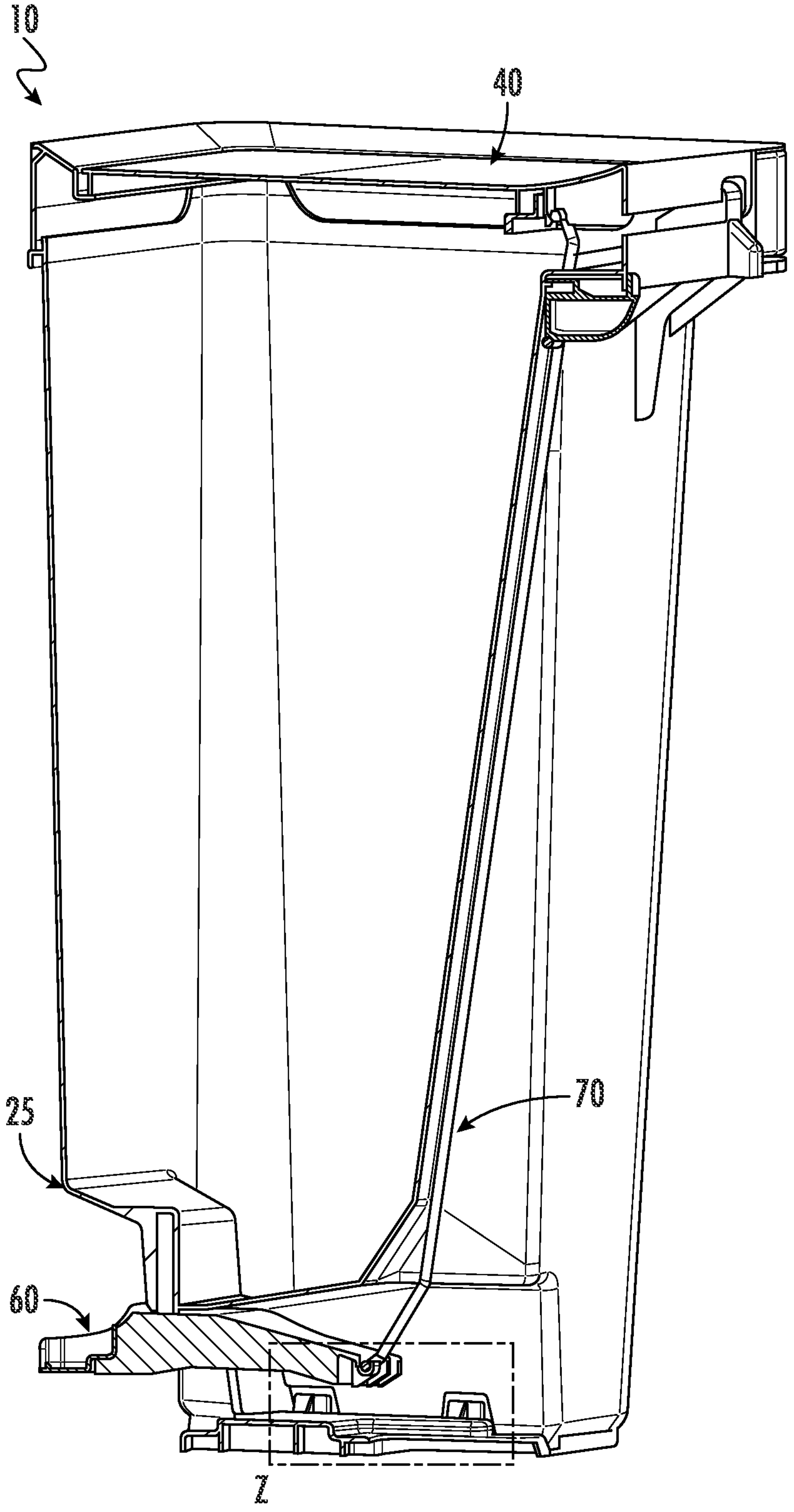
FIG. 5A is a cross-sectional view of the waste receptacle of FIG. 1A in a pedal-extended configuration.
Figure 5B:
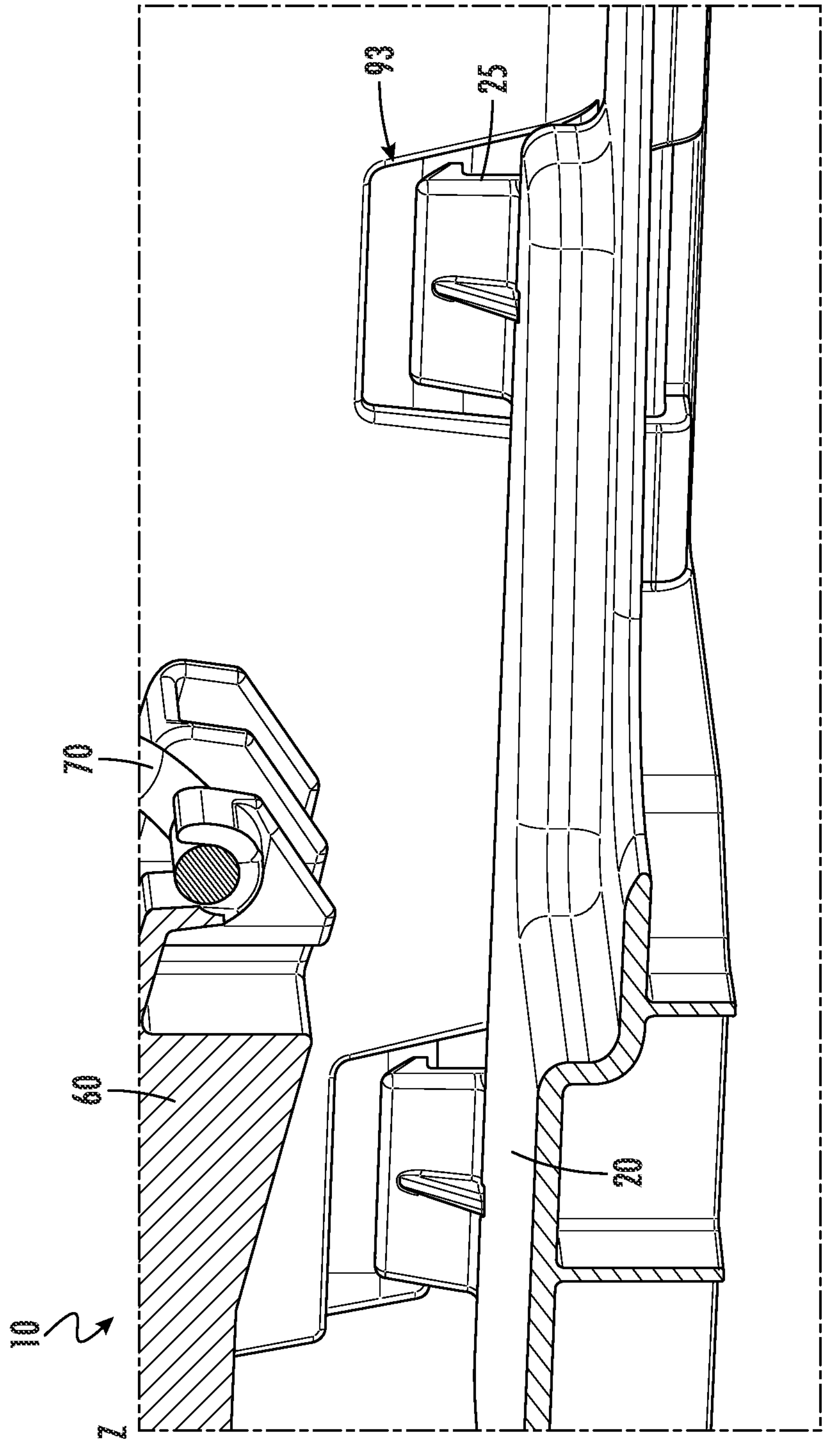
FIG. 5B is a partial enlarged view of region Z of FIG. 5A.
Figure 6A:
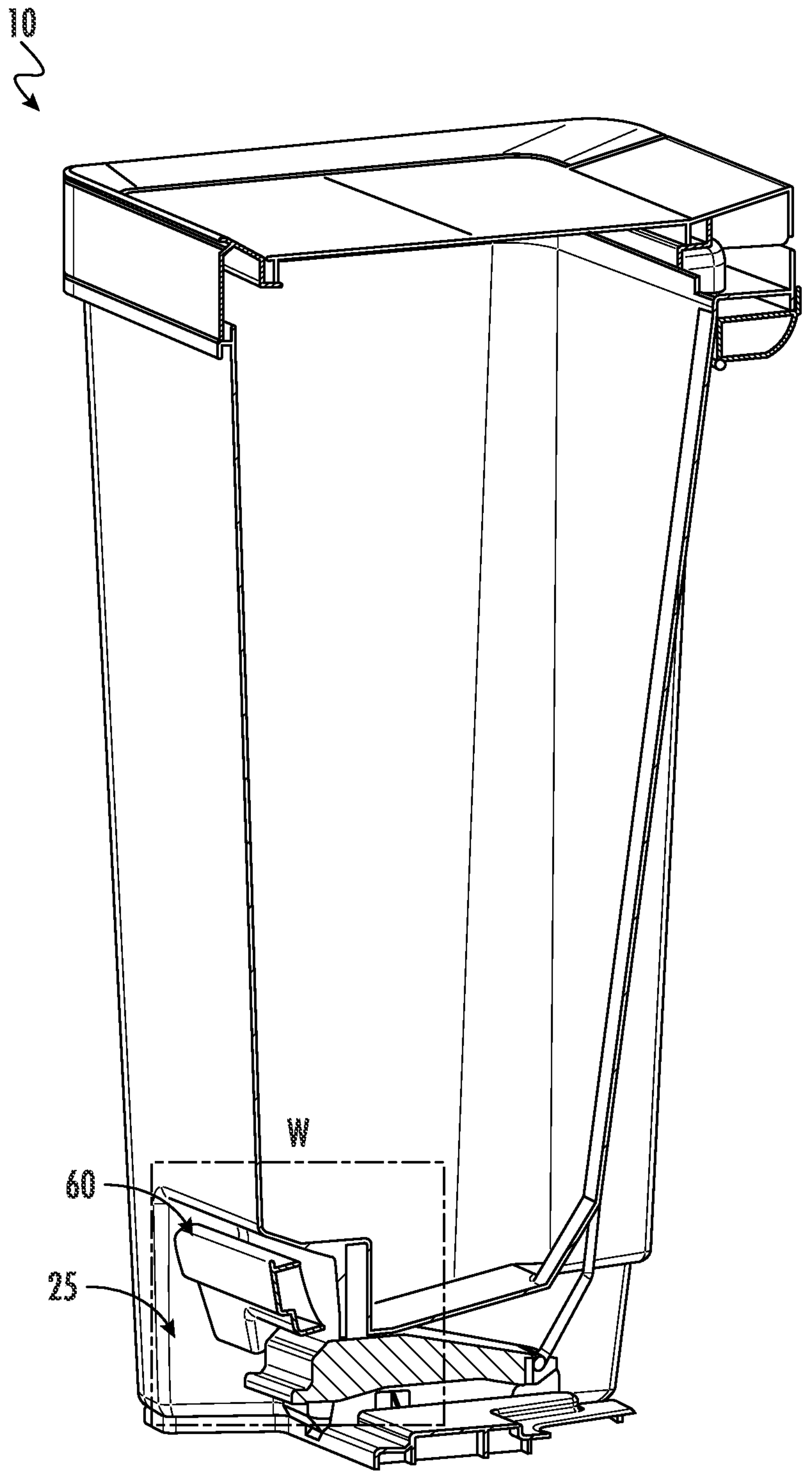
FIG. 6A is a cross-sectional view of the waste receptacle of FIG. 1A in a pedal-folded configuration.
Figure 6B:
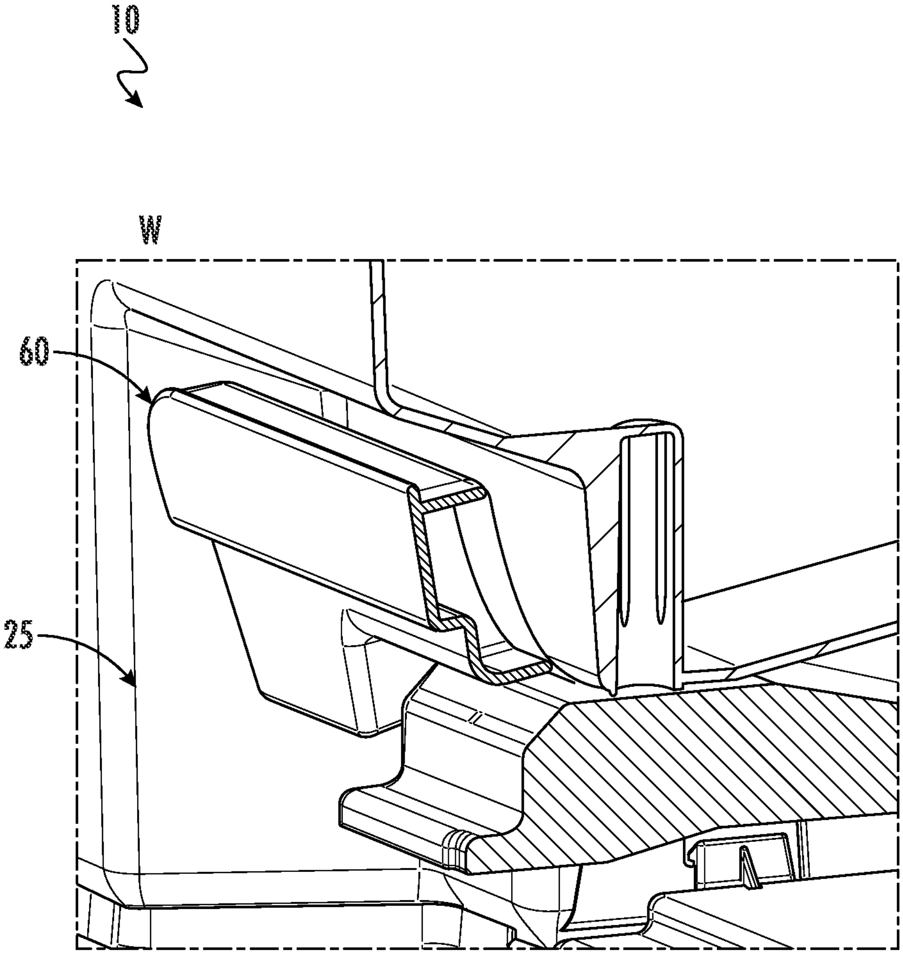
FIG. 6B is a partial enlarged view of region W of FIG. 6A.

In some embodiments, waste receptacle includes housing 12, lid 40, and pedal 60. In some such embodiments, housing 12 includes base 20, rim 14, and housing wall 24 extending between base 20 and rim 14, with rim 14 defining rim opening 16 configured to receive the liner. In some such embodiments, pedal 60 is a foldable pedal adjacent base 20 and operatively coupled to lid 40. For example, foldable pedal 60 is foldable about a fold axis between a pedal-extended configuration and a pedal-folded configuration. In some examples, foldable pedal 60 includes a first pedal part 62, a second pedal part 64, and a third pedal part 66, as shown in FIG. 1A. FIG. 5A is a cross-sectional view of waste receptacle 10 of FIG. 1A in a pedal-extended configuration. FIG. 5B is a partial enlarged view of region Z of FIG. 5A. FIG. 6A is a cross-sectional view of waste receptacle 10 of FIG. 1A in a pedal-folded configuration. FIG. 6B is a partial enlarged view of region W of FIG. 6A.

As seen in FIG. 5A, pedal 60 may be operatively coupled to lid 40 by lift-rod 70 (or any other suitable mechanism). Foldable pedal 60 is extended in the configuration shown in FIG. 5A, ready to receive a press or step from a user. In the pedal-extended configuration, pedal 60 is capable of receiving the press or step and ultimately causes lid 40 to open via lifting of lift-rod 70. In some embodiments, housing 12 defines a recess 25, with pedal 60 at least partially disposed in the recess. For example, foldable pedal 60 is disposed in recess 25, in the pedal-extended configuration. A portion of foldable pedal 60 may protrude or extend out from recess 25 relative to housing wall 24. Such protrusion or extension of the foldable pedal in the pedal-extended configuration may facilitate pressing or stepping of pedal 60 with ease. In some embodiments, pedal 60 defines a curved or arcuate pedal surface 68, for example, as seen in FIG. 1C. Curved pedal surface 68 may curve upward or downward. In some embodiments, curved pedal surface 68 curves upward (away from the floor or from base 20). Such an upward curvature of pedal surface 68 may provide better access to pedal 60 and promote contact with pedal 60 for improved depression of pedal 60.

Foldable pedal 60 is pivotable about a pivot axis to cause lid 40 to move between a lid-open configuration and a lid-closed configuration. In some such embodiments, the foldable pedal 60 is operatively coupled to lid 40 by lift-rod 70. In some embodiments, the pivot axis is co-axial with the fold axis. In other embodiments, the pivot axis is spaced from the fold axis.

Foldable pedal 60 may be folded in a pedal-folded configuration, as shown in FIGS. 6A and 6B. In embodiments in which housing 12 defines recess 25, pedal 60 may be folded into recess 25, such that no portion of pedal 60 protrudes or extends out from recess 25 relative to housing wall 24 in the pedal-folded configuration. In such a configuration, a user may not succeed in accessing pedal 60 to actuate movement of lid 40. Thus, in some such embodiments, folding of foldable pedal 60, for example, against housing wall 24, or into recess 25, may prevent inadvertent pressing of pedal 60, or pressing by unauthorized parties, including pets or children. Accordingly, foldable pedal may be disposed in recess 25 in the pedal-folded configuration.

Figure 7A:
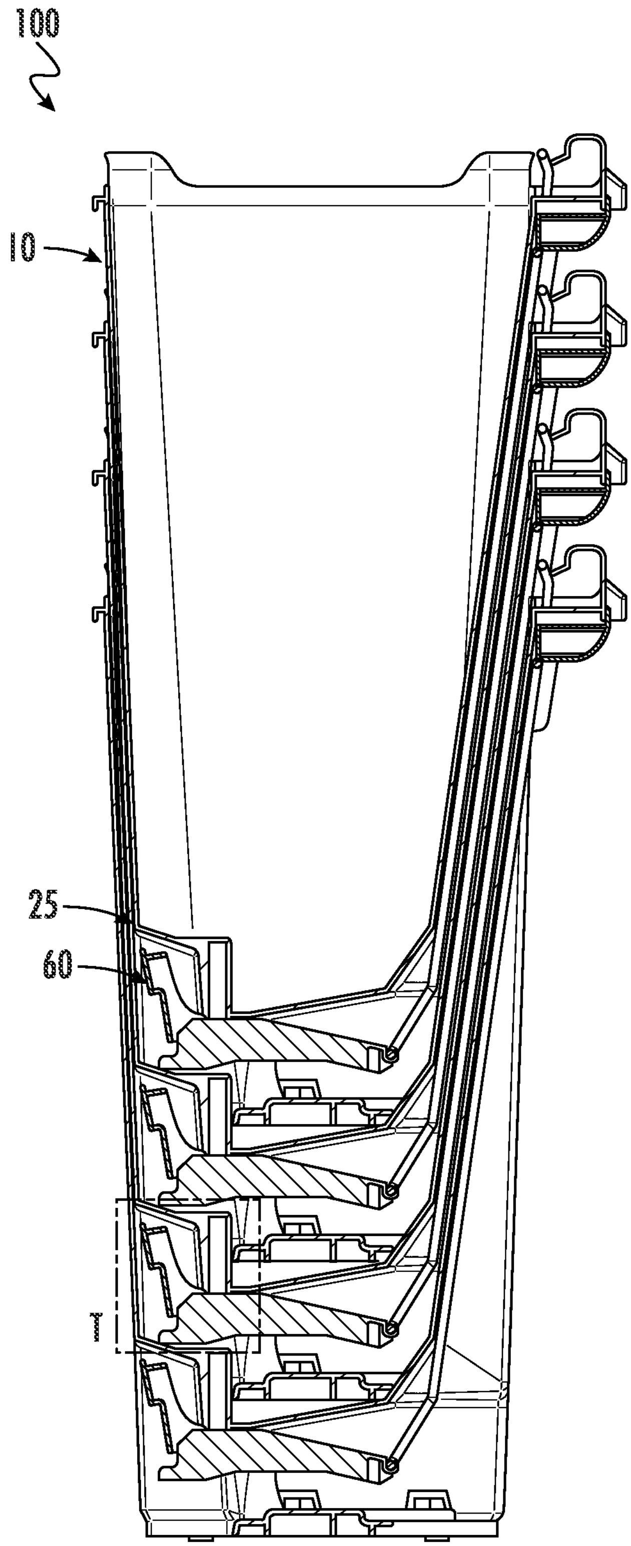
FIG. 7A is a cross-sectional view of an assembly including a vertically stacked plurality of waste receptacles in a pedal-folded configuration.
Figure 7B:
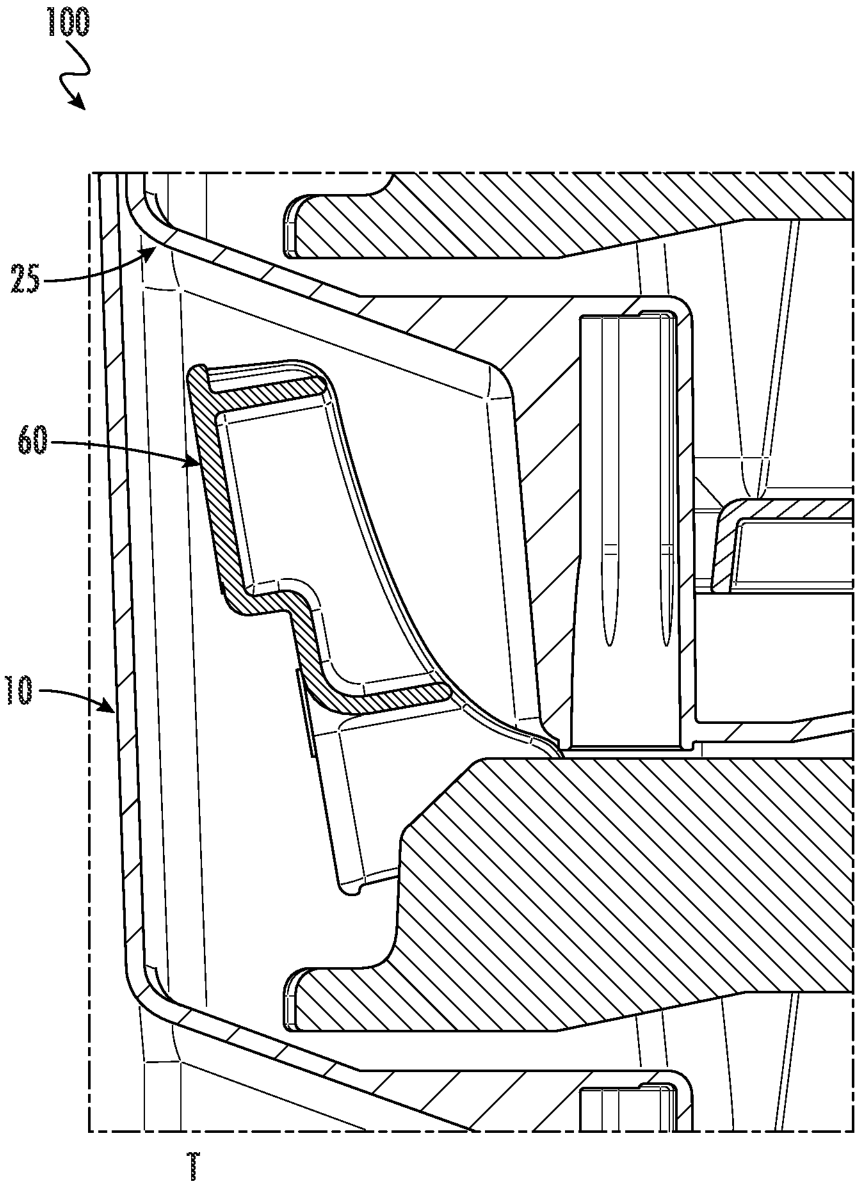
FIG. 7B is a partial enlarged view of region T of FIG. 7A.

Folding of foldable pedal 60 may also promote stacking or nesting of multiple waste receptacles into each other for storage or transport, reducing the overall volume occupied by multiple waste receptacles. FIG. 7A is a cross-sectional view of an assembly 100 including a vertically stacked plurality of waste receptacles including waste receptacle 10 in a pedal-folded configuration. FIG. 7B is a partial enlarged view of region T of FIG. 7A.

As seen in FIGS. 7A and 7B, folding of foldable pedal 60, for example, into recess 25, or otherwise against housing wall 24, promotes nesting or stacking of multiple receptacles. For example, no portion of pedal 60 in the pedal-folded configuration extends in a manner relative to housing walls of respective adjacent nested receptacles to constrain or prevent adjacent housing walls sliding past each other. Alternatively, there may be minimal or reduced contact between pedal 60 and adjacent housing walls that still permits sufficient relative movement of adjacent receptacles in assembly 100 to permit nesting or stacking and de-nesting or de-stacking. In some such embodiments, no portion of foldable pedal 60 extends beyond recess 25 in the pedal-folded configuration, waste receptacle 10 is a first waste receptacle, and the first waste receptacle is stackable within a second waste receptacle in the pedal-folded configuration, as shown in FIGS. 7A and 7B.

In some embodiments, waste receptacle 10 includes locking tab 80. Locking tab 80 allows lid 40 to be held open in a lid-open configuration, or prevent opening of lid 40 from a lid-closed configuration. In some such embodiments, waste receptacle 10 includes housing 12, lid 40, lift-rod 70, pedal 60, and locking tab 80. Pedal 60 may or may not be foldable in such embodiments. In such embodiments, housing 12 may include base 20, rim 14, and housing wall 24 extending between base 20 and rim 14, rim 14 defining rim opening 16 configured to receive the liner. Pedal 60 may be disposed adjacent base 20 and operatively coupled to lid 40 by lift-rod 70. In such embodiments, waste receptacle 10 includes locking tab 80 movable between a locked configuration and an unlocked configuration. Locking tab 80 may be placed in any suitable position adjacent lift-rod 70 and engageable with lift-rod 70, for example, anywhere adjacent any suitable portion of lift-rod 70. In some embodiments, locking tab 80 is position adjacent rim 14 to facilitate ergonomic access to locking tab 80. In some embodiments, locking tab 80 is positioned at a rear of waste receptacle 10 to conceal lock tab 80 from view. Locking tab 80 may be provided with printed, embossed, or raised features or designs to indicate the direction of movement for locking or unlocking. For example, locking tab 80 may be provided a lock symbol and a first arrow, and an unlock symbol and a second arrow, as shown in FIG. 8.

Locking tab is engaged with lift-rod 70 in the locked configuration to resist movement of lift-rod 70, and locking tab 80 is disengaged from lift-rod 80 in the unlocked configuration to permit movement of lift-rod 70. In some such embodiments, lift-rod 70 defines a locking member 72 configured to engage locking tab 80. For example, as shown in FIG. 1A, locking member 72 may extend transverse to a main body of lift-rod 70. Locking member 72 may be integral with lift rod 70, or may be a separate component secured to lift-rod 70. Locking member 72 may be formed of a rigid material. The material may be the same as lift-rod 70 or different from that of lift-rod 70.

In some embodiments, housing 12 defines a sliding channel that movably secures 80 locking tab. For example, locking tab 80 may be movable along the sliding channel while remaining secured in the sliding channel. In some such embodiments, locking tab 80 is laterally slidable relative to rim 14 between the locked configuration and the unlocked configuration along the sliding channel. In some such embodiments, the sliding channel defines a first detent to retain locking tab 80 in the locked configuration and a second detent to retain locking tab 80 in the unlocked configuration.

Figure 8:
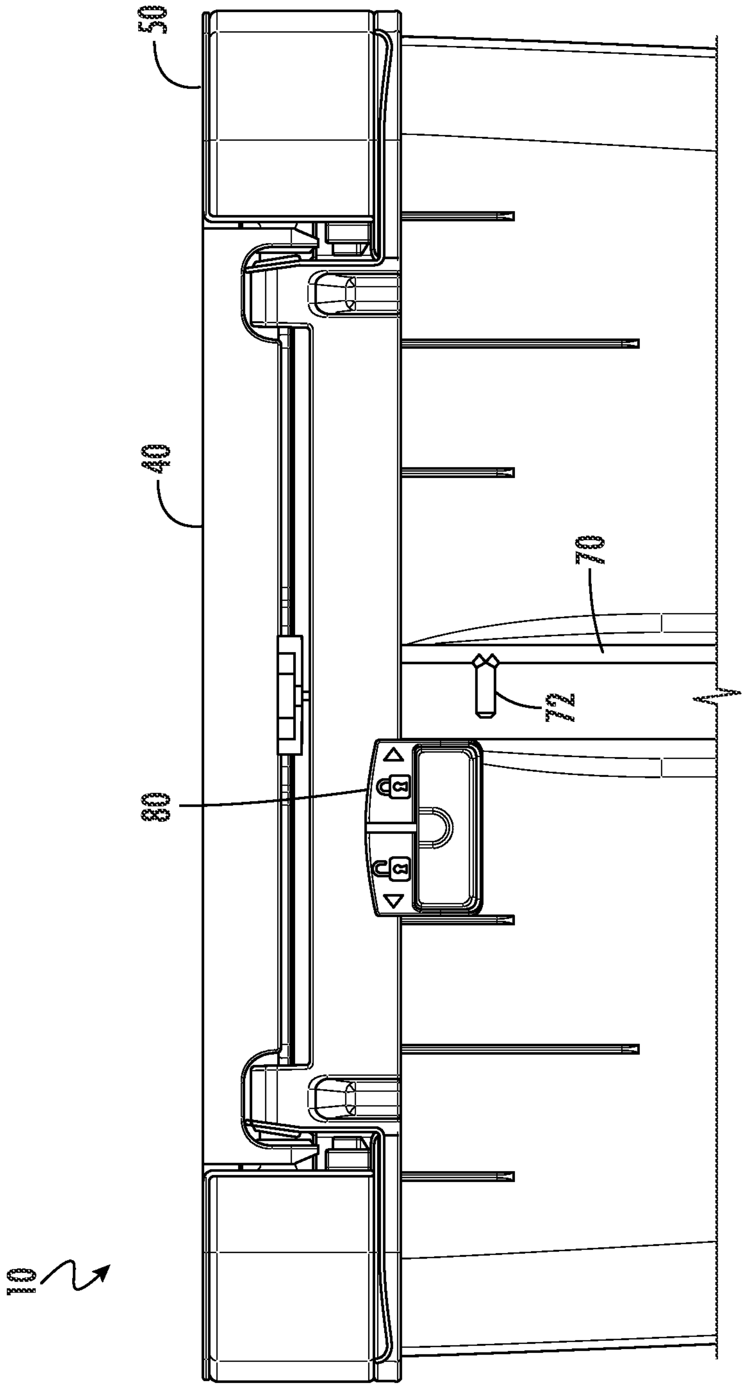
FIG. 8 is a partial rear view of the waste receptacle of FIG. 1A in a lid-closed configuration including a locking tab in an unlocked configuration.

Locking tab 80 may be used in the lid-open or lid-closed configuration, as shown in FIGS. 8 to 10B. FIG. 8 is a partial rear view of waste receptacle 10 of FIG. 1A in a lid-closed configuration including locking tab 80 in an unlocked configuration. FIG. 9A is a partial rear view of waste receptacle 10 of FIG. 1A in a lid-closed configuration showing locking tab 80 in a locked configuration. FIG. 9B is a partial rear perspective view of the waste receptacle of FIG. 1A in a lid-closed configuration showing locking tab in a locked configuration.

Figure 9A:
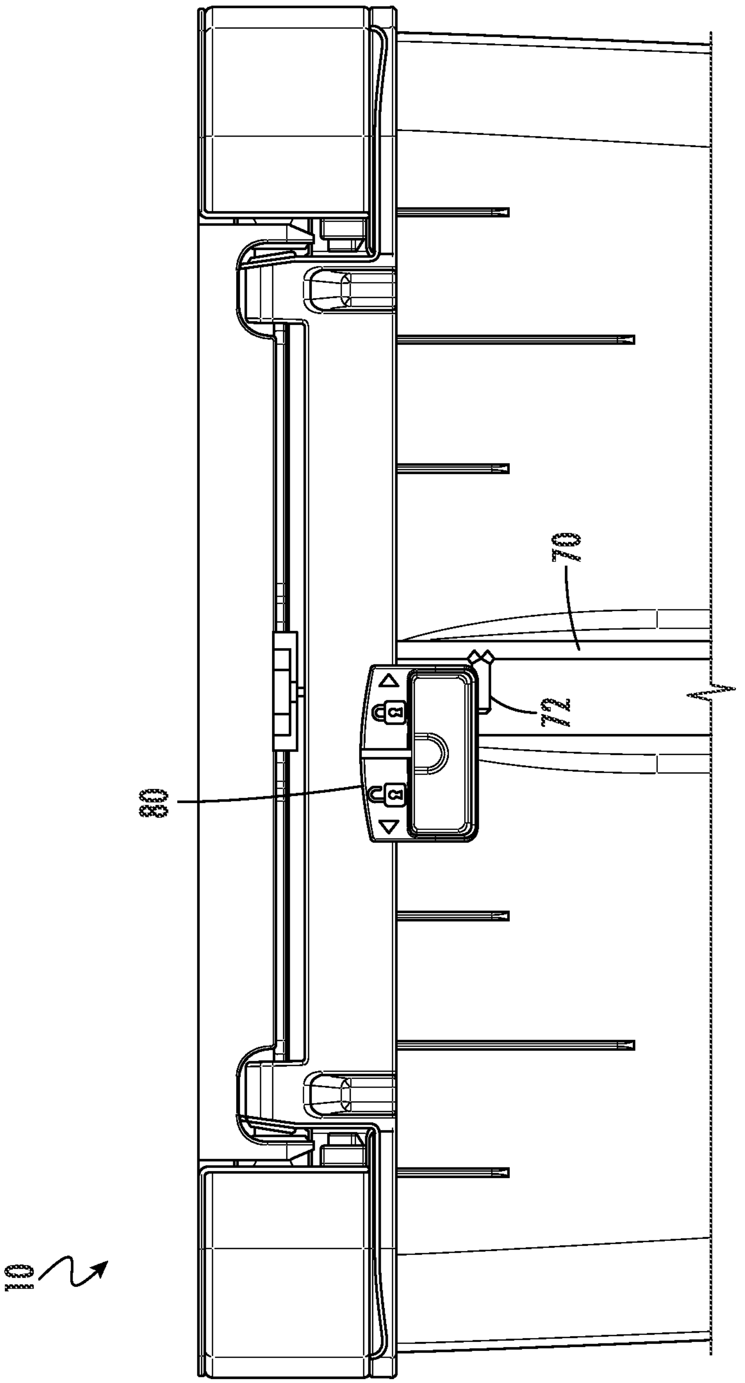
FIG. 9A is a partial rear view of the waste receptacle of FIG. 1A in a lid-closed configuration showing a locking tab in a locked configuration.
Figure 9B:
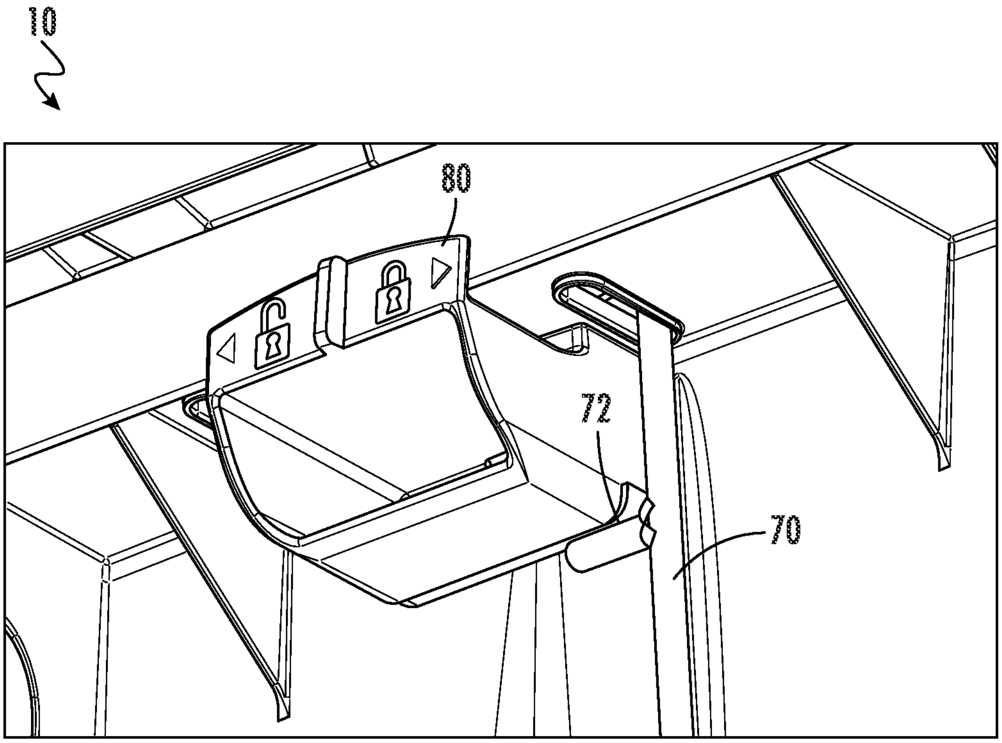
FIG. 9B is a partial rear perspective view of the waste receptacle of FIG. 1A in a lid-closed configuration showing a locking tab in a locked configuration.

In the lid-closed configuration, locking tab 80 in the locked configuration engages lift-rod 70 to resist movement of lift-rod 70. Thus, even if a user attempts to press pedal 60, lift-rod 70 resists movement, and lid 40 resists opening. For example, locking member 72 may contact a lower portion of locking tab 80 (or any other suitable portion), as shown in FIG. 9B, if a user attempts to press pedal 60 in the lid-closed configuration. Such contact may lock lift-rod from moving up against the direction of gravity. Moving locking tab 80 to the unlock configuration causes locking tab 80 to disengage from lift-rod 70, so that locking tab 80 substantially does not resist movement of lift-rod 70. In such an unlocked configuration, lift-rod 70 is free to move to cause lid 40 to open in response to pressing of pedal 60.

Figure 10A:
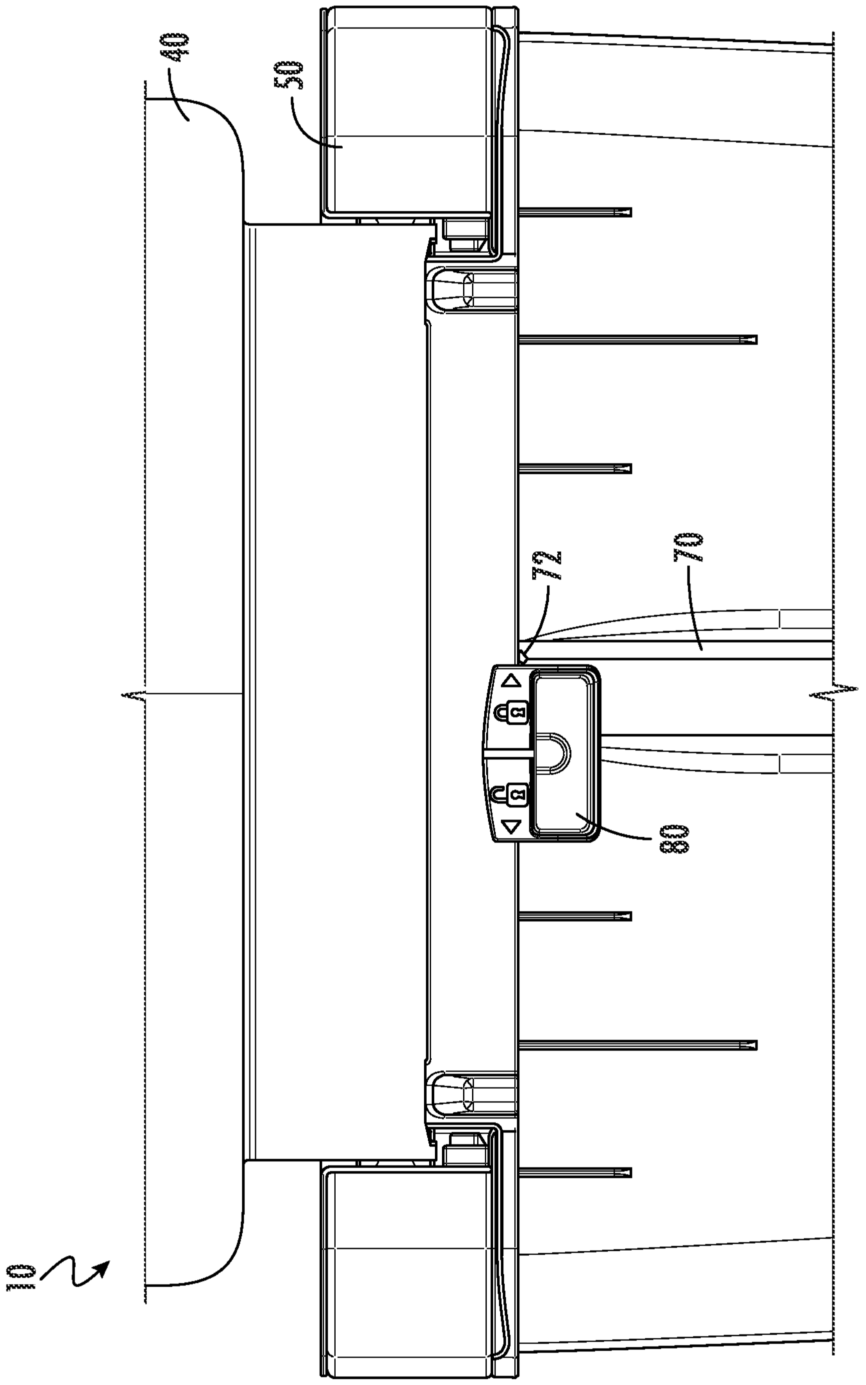
FIG. 10A is a partial rear view of the waste receptacle of FIG. 1A in a lid-open configuration showing a locking tab in a locked configuration.
Figure 10B:
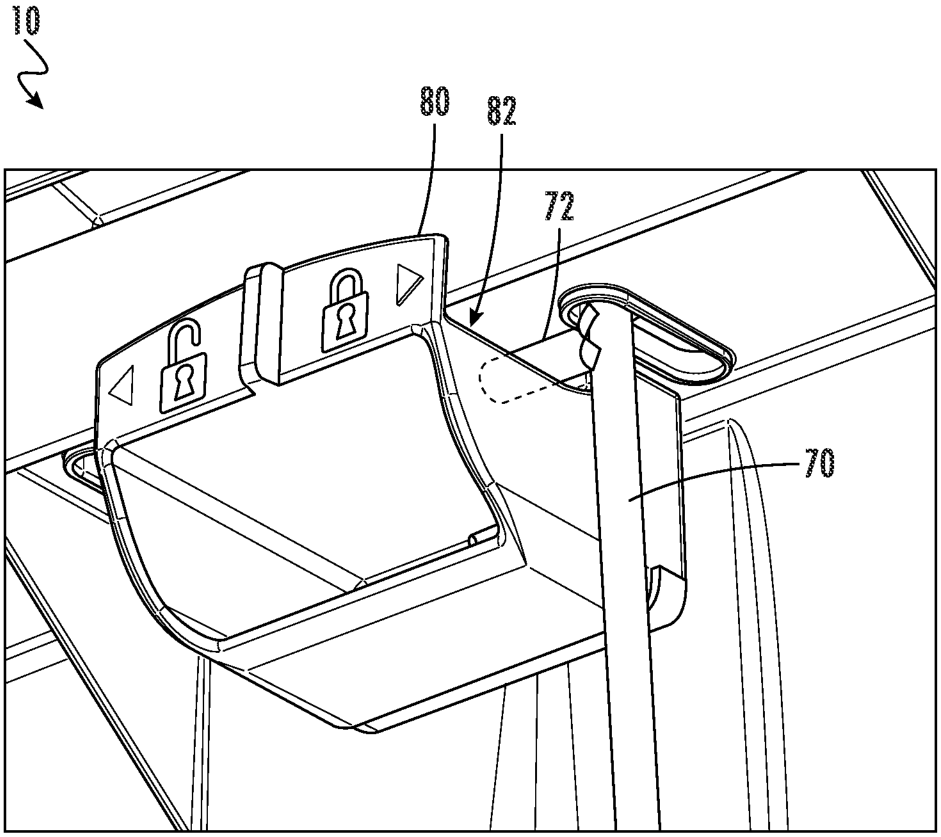
FIG. 10B is a partial rear perspective view of the waste receptacle of FIG. 1A in a lid-open configuration showing a locking tab in a locked configuration.

FIG. 10A is a partial rear view of waste receptacle 10 of FIG. 1A in a lid-open configuration showing locking tab 80 in a locked configuration. FIG. 10B is a partial rear perspective view of waste receptacle of FIG. 1A in the lid-open configuration showing locking tab 80 in a locked configuration. In the lid-open configuration, placing locking tab in the locked configuration engages lift-rod 70 to resist movement of lift-rod 70. Thus, even if a user stops pressing pedal 60, or otherwise no longer exerts a lifting force or torque on lid 40, lid 40 remains open, because lift-rod 70 continues to push against lid 40 even in absence of pressure on pedal 60. Moving locking tab 80 to the unlock configuration causes locking tab 80 to disengage from lift-rod 70, so that locking tab 80 substantially does not resist movement of lift-rod 70. In such an unlocked configuration, lift-rod 70 is free to move to permit lid 40 to fall and close in response to removing pressure from pedal 60, or otherwise not exerting a lifting torque or force on lid 40.

In some embodiments, locking tab 80 defines a tab recess 82, as shown in FIG. 10B. In the lid-open configuration, tab recess 82 may receive locking member 72 of lift-rod 70, to resist lift-rod 70 from falling in response to gravity, even if pressure is removed from pedal 60.

In some embodiments, waste receptacle 10 includes at least one dampening foot 90. The dampening foot 90 or plurality of dampening feet 90 may promote stability of waste receptacle 10. In some such embodiments, waste receptacle 10 includes housing 12 including base 20, rim 14, and housing wall 24 extending between base 20 and rim 14, rim 14 defining rim opening 16 configured to receive the liner. The waste receptacle 10 also includes lid 40 movable between a lid-closed configuration and a lid-open configuration, lift-rod 70, pedal 60 being disposed adjacent base 20 and operatively coupled to lid 40 by lift-rod 70, where pedal 60 is configured to move lid 40 between the lid-closed configuration and the lid-open configuration via lift-rod 70. The waste receptacle 10 may further include a plurality of dampening feet 90 disposed on an exterior of base 20 and extending in a downward direction away from rim opening 16. Dampening feet 90 are configured to resist shock, force, or torque applied to housing 12 in response to movement of pedal 60, lift-rod 70, or lid 40.

Figure 1H:
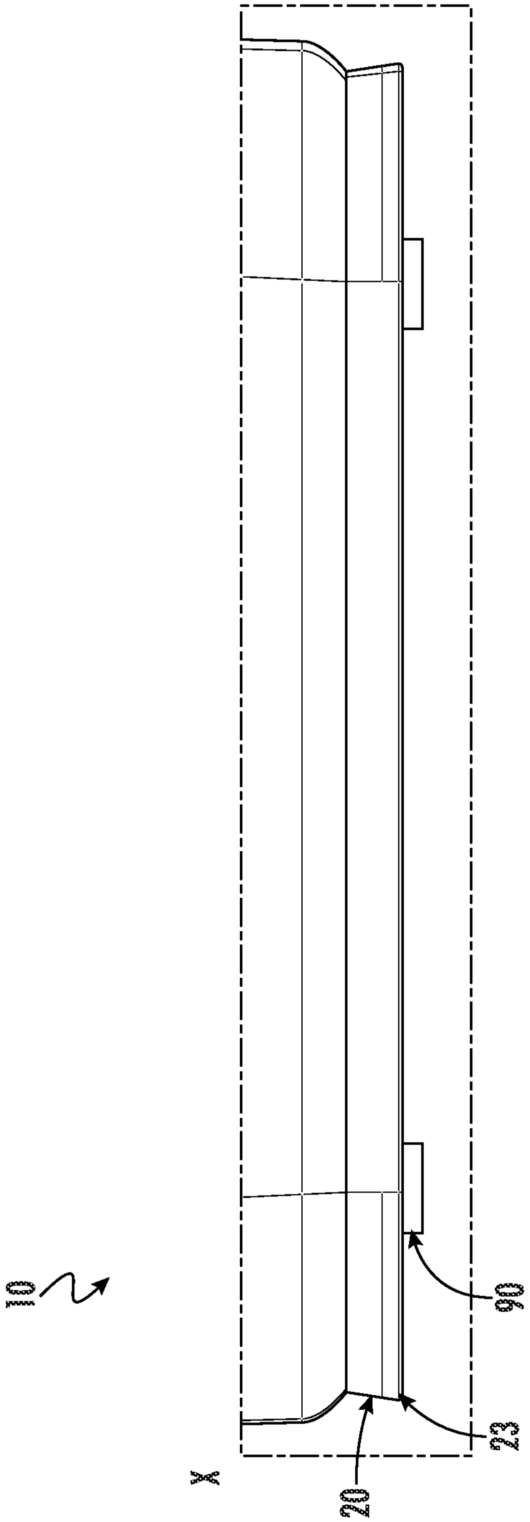
FIG. 1H is an enlarged partial view of region X of FIG. 1F.
Figure 1I:
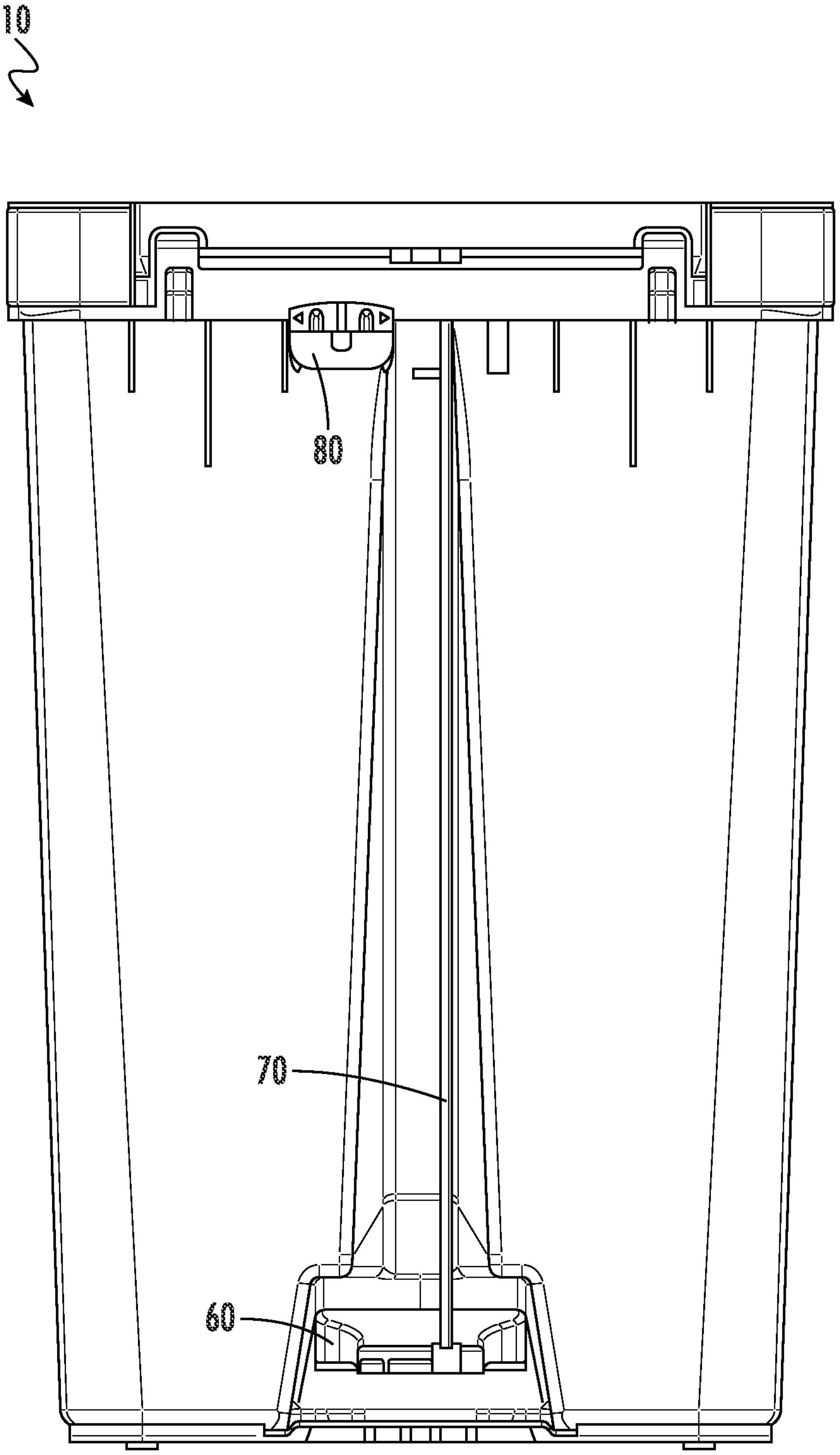
FIG. 1I is a rear view of the waste receptacle of FIG. 1A.
Figure 1J:
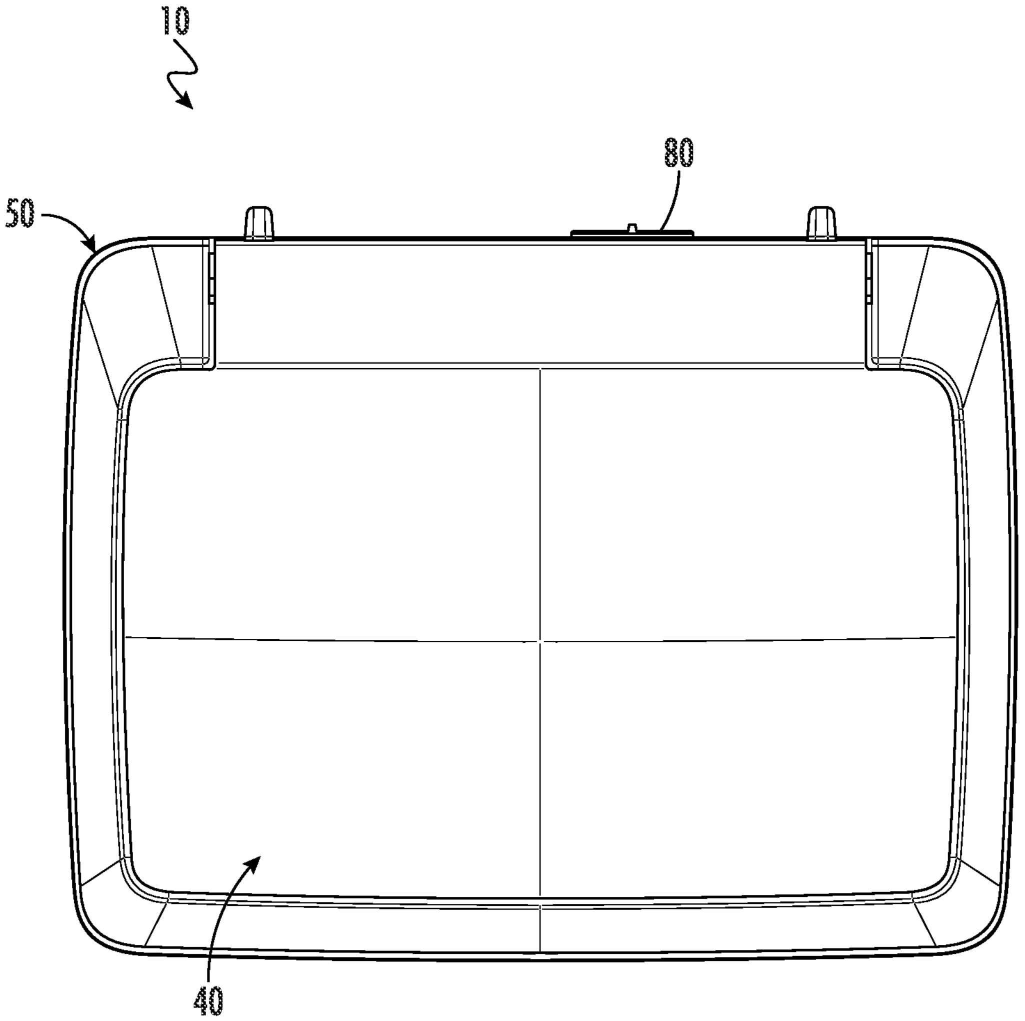
FIG. 1J is a top view of the waste receptacle of FIG. 1A.
Figure 1K:
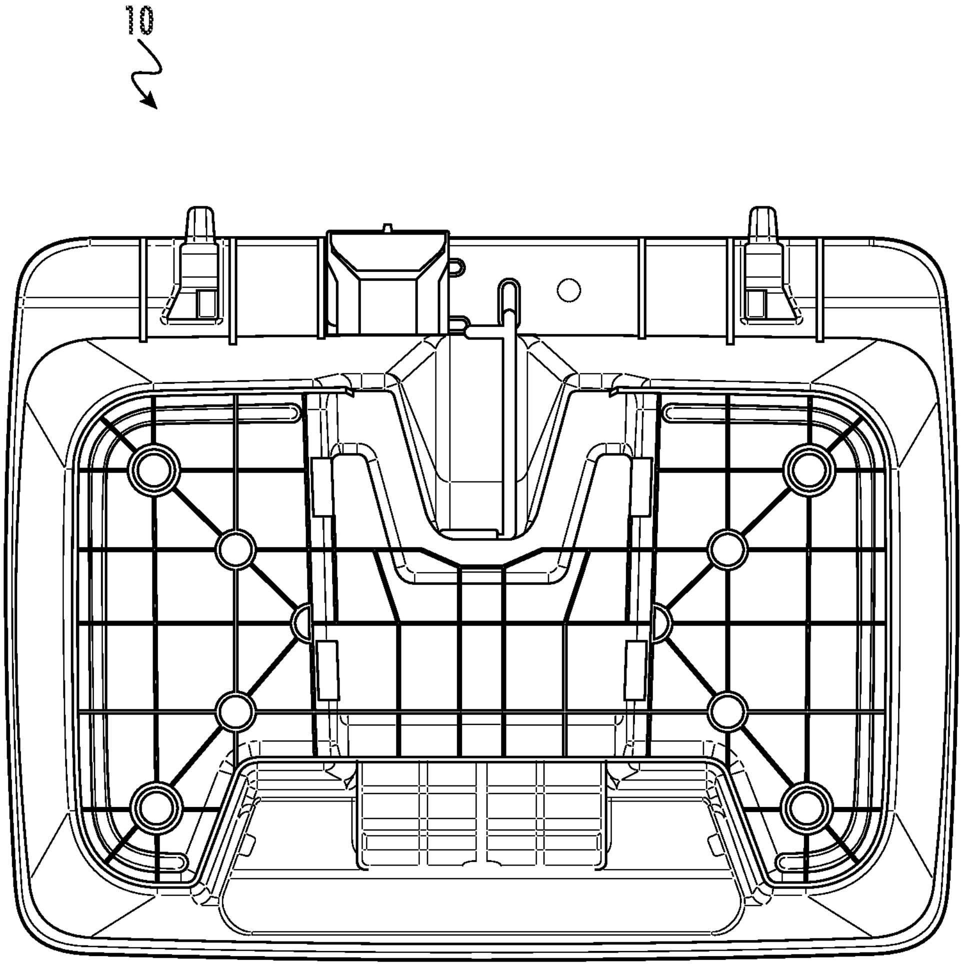
FIG. 1K is a bottom view of the waste receptacle of FIG. 1A.

Waste receptacle 10 may include stabilizing features, for example, in addition to, or instead of, dampening feet 90. For example, base 20 may define at least one sharp corner 23, as shown in FIG. 1H. The relatively sharp corner 23 (compared to a rounded or curved corner) may provide better tipping resistance compared to rounded corners. For example, a rounded corner may allow base 20 to slide along the floor without significantly resisting tipping, while sharp corner 23 may catch against or contact the floor to resist tipping.

Housing 12 may define at least one vent 93 adjacent base 20, as shown in FIG. 5B. Vent 93 may reduce vacuum or suction between the liner and an interior surface of housing 12, which may facilitate removal of liner from housing 12. In some embodiments, vent 93 may also provide an attachment position for attaching base 20 to housing 12, for example, via a clip 25 defined by base 20.

While base 20 is described with reference to various embodiments, in some embodiments, waste receptacle 10 does not include a separate base 20, and a lower portion of housing 12 functions as base 20. Thus, dampening feet 90 may be disposed on or in a lower surface or portion of housing 12 functioning as base 20, rather than in a separate base 20.

In some embodiments, base 20 defines four corners, and the plurality of dampening feet 90 consists of four dampening feet, each dampening foot 90 of the four dampening feet being disposed at or near a respective corner of the four corners.

In some embodiments, the plurality of dampening feet includes a dampening member. The dampening member may be the same or different in different dampening feet, and may include one or more soft, flexible, resiliently deformable, shock-absorbing, or cushioning material. The material may include one or more of suitable natural or synthetic rubber, polymer, or elastomer materials. In some embodiments, the dampening member includes an elastomeric material. For example, the elastomeric material may include thermoplastic elastomer (TPE), such as thermoplastic polyurethane (TPU). In some embodiments, the dampening member is an elastomeric member.

While the disclosure has been described with reference to a number of embodiments, it will be understood by those skilled in the art that the invention is not limited to such disclosed embodiments. Rather, the invention can be modified to incorporate any number of variations, alterations, substitutions, or equivalent arrangements not described herein, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A waste receptacle comprising:

a housing defining a rim, the rim defining a rim opening configured to receive a liner; and a plurality of retention tabs extending from the rim;

wherein at least one retention tab of the plurality of retention tabs extends outward relative to the rim opening, wherein the at least one retention tab has a non-planar contour and extends along the rim from a first side of a corner to a second side of the corner, and wherein the at least one retention tab comprises:

an upper end that is flared outward toward an exterior of the housing; and a base portion adjacent to the upper end, wherein the base portion is inset from an outer edge of the rim relative to the rim opening.

2. The waste receptacle of claim 1, wherein the at least one retention tab defines the base portion adjacent the rim and the upper end extending from the base portion away from the rim opening, and wherein the upper end projects outward relative to the rim opening.

3. The waste receptacle of claim 2, wherein the at least one retention tab comprises a curved portion between the base portion and the upper edge, and wherein the upper end flares outward relative to the rim opening.

4. The waste receptacle of claim 1, further comprising a lid movable between a lid-closed configuration in which the lid extends laterally across the rim opening and a lid-open configuration in which the lid is spaced from the rim opening.

5. The waste receptacle of claim 4, wherein the lid is completely separable from the rim or from the housing.

6. The waste receptacle of claim 4, wherein the lid is secured along a lid edge to the rim and is configured to pivot about the lid edge relative to the rim opening between the lid open configuration and the lid-closed configuration.

7. The waste receptacle of claim 4, wherein the lid covers and conceals the plurality of retention tabs in the lid-closed configuration.

8. The waste receptacle of claim 4, wherein the plurality of retention tabs is configured to securely retain the liner in any of the shroud-open configuration, the shroud-closed configuration, the lid-open configuration, and the lid-closed configuration.

9. The waste receptacle of claim 4, wherein the plurality of retention tabs defines at least one inter-tab spacing configured to receive a finger or a tool between adjacent retention tabs of the plurality of retention tabs to contact and remove the liner from the retention tabs.

10. The waste receptacle of claim 1, further comprising a shroud defining a shroud opening, wherein the shroud is movable between a shroud-closed configuration in which the shroud opening aligns with the rim opening and a shroud-open configuration in which the shroud opening is at least partially spaced from the rim opening.

11. The waste receptacle of claim 10, wherein the shroud covers and conceals the plurality of retention tabs in the shroud-closed configuration.

12. The waste receptacle of claim 10, wherein the shroud is completely separable from the housing.

13. The waste receptacle of claim 10, wherein the shroud is secured along a shroud edge of the shroud to the housing and configured to pivot about the shroud edge between the shroud-open configuration and the shroud-closed configuration.

14. The waste receptacle of claim 10, further comprising the lid, wherein the lid extends laterally across the shroud opening in the lid-closed configuration, and wherein the lid is spaced from the shroud opening in the lid-open configuration.

15. The waste receptacle of claim 14, wherein the lid is completely separable from the shroud.

16. The waste receptacle of claim 14, wherein the lid is secured along the lid edge to the shroud and configured to pivot about the lid edge relative to the shroud opening between the lid-open configuration and the lid-closed configuration.

17. The waste receptacle of claim 1, wherein the rim defines at least one corner, and wherein the at least one retention tab is disposed at a respective corner of the at least one corner of the rim.

18. The waste receptacle of claim 17, wherein the at least one corner consists of four corners, and wherein the at least one retention tab consists of four retention tabs, each retention tab of the four retention tabs being disposed at a respective corner of the four corners.

* * * * *